(12) United States Patent
Wadhwa et al.

(10) Patent No.: US 9,338,331 B2
(45) Date of Patent: May 10, 2016

(54) RIESZ PYRAMIDS FOR FAST PHASE-BASED VIDEO MAGNIFICATION

(71) Applicant: Massachusetts Institute of Technology, Cambridge, MA (US)

(72) Inventors: Neal Wadhwa, Cambridge, MA (US); Michael Rubinstein, Newton, MA (US); Frederic Durand, Somerville, MA (US); William T. Freeman, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/592,211

(22) Filed: Jan. 8, 2015

(65) Prior Publication Data

US 2015/0195430 A1     Jul. 9, 2015

Related U.S. Application Data

(60) Provisional application No. 61/925,283, filed on Jan. 9, 2014.

(51) Int. Cl.
| | |
|---|---|
| *H04N 5/14* | (2006.01) |
| *G06T 3/40* | (2006.01) |
| *H04N 5/20* | (2006.01) |
| *H04N 5/213* | (2006.01) |

(52) U.S. Cl.
CPC ........ *H04N 5/144* (2013.01); *G06T 3/40* (2013.01); *G09G 2340/045* (2013.01); *H04N 5/20* (2013.01); *H04N 5/213* (2013.01)

(58) Field of Classification Search
None
See application file for complete search history.

(56) References Cited

U.S. PATENT DOCUMENTS

| | | | | |
|---|---|---|---|---|
| 2009/0208080 | A1* | 8/2009 | Grau | G06T 5/50 382/131 |
| 2014/0072190 | A1 | 3/2014 | Wu et al. | |
| 2014/0072228 | A1* | 3/2014 | Rubinstein | G06T 7/206 382/197 |
| 2014/0072229 | A1* | 3/2014 | Wadhwa | G06K 9/481 382/197 |

(Continued)

OTHER PUBLICATIONS

"Applicants' Presentation Overview," Aug. 2014, retrieved from the Internet URL: http://people.csail.mit.edu/nwadhwa/riesz-pyramid/, 3 pages, May 2014.

(Continued)

*Primary Examiner* — Sean Motsinger
(74) *Attorney, Agent, or Firm* — Hamilton, Brook, Smith & Reynolds, P.C.

(57) ABSTRACT

Some embodiments are directed to a method, corresponding system, and corresponding apparatus for rendering a video and/or image display to amplify small motions through video magnification. Some embodiments include a new compact image pyramid representation, the Riesz pyramid, that may be used for real-time, high-quality phase-based video magnification. Some embodiments are less overcomplete than even the smallest two orientation, octave-bandwidth complex steerable pyramid. Some embodiments are implemented using compact, efficient linear filters in the spatial domain. Some embodiments produce motion magnified videos that are of comparable quality to those using the complex steerable pyramid. In some embodiments, the Riesz pyramid is used with phase-based video magnification. The Riesz pyramid may phase-shift image features along their dominant orientation, rather than along every orientation like the complex steerable pyramid.

23 Claims, 21 Drawing Sheets
(10 of 21 Drawing Sheet(s) Filed in Color)

(56) References Cited

U.S. PATENT DOCUMENTS

| | | | | |
|---|---|---|---|---|
| 2014/0153692 A1* | 6/2014 | Larkin | ............... | G06T 5/10 378/36 |
| 2015/0124062 A1* | 5/2015 | Didyk | ............... | H04N 13/0011 348/51 |

OTHER PUBLICATIONS

"Applicants' Video—Wine Glass," Aug. 2014, retrieved from the Internet URL: http://people.csail.mit.edu/nwadhwa/riesz-pyramid/, 2 pages, May 2014.

"Applicants' Presentation," Riesz Pyramids for Fast Phase-Based Video Magnification, Aug. 2014, retrieved from the Internet URL: http://people.csail.mit.edu/nwadhwa/riesz-pyramid/Riesz%20Pyramids%20for%20Fast%20Phase-Based%20Video%20Magnification.pptx, 43 pages, May 2014.

"Applicants' Videos in Presentation," Aug. 2014, retrieved from the Internet URL: http://people.csail.mit.edu/nwadhwa/riesz-pyramid/RieszPyramidICCP2014pres.zip, 7 pages, May 2014.

Applicants' Video Results and Comparisons, retrieved from the Internet URL: http://people.csail.mit.edu/nwadhwa/riesz-pyramid/RieszPyrResultsAndComparisons.zip, 8 pages, May 2014.

Wadhwa, N., Rubinstein, M., Durand, F., and Freeman, W.T., "Supplemental for Riesz Pyramids for Fast Phase-Based Video Magnification," retrieved from the Internet URL: http://people.csail.mit.edu/nwadhwa/riesz-pyramid/RieszPyrSupplemental.zip, 5 pages, May 2014.

Burt, P. and Adelson, E. H., "The Laplacian Pyramid as a Compact Image Code," *IEEE Trans. Comm.*, 31, 4, Apr. 1983, 532-540.

Chen, J. G., Wadhwa, N., Cha, Y.-J., Durand, F., Freeman, W. T., and Buyukorturk, O., "Structural Modal Identification Through High Speed Camera Video: Motion Magnification," *Proceedings of the 32nd International Modal Analysis Conference*, IMAC Jul. 2014, 191-197.

Felsberg, M. and Sommer, G., "The Monogenic Signal," *IEEE Transactions on Signal Processing*, 49, 12, Dec. 2001, 3136-3144.

Fleet, D. J. and Jepson, A. D, "Computation of Component Image Velocity from Local Phase Information," *International Journal of Computer Vision*, 5, 1, Aug. 1990, 77-104.

Gautama, T. and Van Hulk, M., "A Phase-Based Approach to the Estimation of the Optical Flow Field Using Spatial Filtering," *IEEE Transactions on Neural Networks*, 13, 5, Sep. 2002, 1127-1136.

Lee, J. and Shin, S. Y., "General Construction of Time-Domain Filters for Orientation Data," *IEEE Transactions on Visualization and Computer Graphics*, 8, 2, Apr.-Jun. 2002, 119-128.

J. S. Lim, Two-dimensional signal and image processing, Englewood Cliffs, NJ, Prentice Hall, 694 pages (table of contents included only), Sep. 1989.

Liu, C., Torralba, A., Freeman, W. T., Durand, F., and Adelson, E. H., "Motion Magnification," *ACM Trans. Graph.*, 24, 3, Jul. 2005, 519-526.

Portilla, J. and Simoncelli, E. P., "A Parametric Texture Model Based on Joint Statics of Complex Wavelet Coefficients," *International Journal of Computer Vision*, 40, Oct. 1, 2000, 49-70.

Simoncelli, E. P., "Design of Multi-Dimensional Derivative Filters," *IEEE International Conference on Image Processing*, vol. 1, Nov. 1994, 790-794.

Simoncelli, E. P., and Freeman, W. T., "The Steerable Pyramid: A Flexible Architecture for Multi-Scale Derivative Computation," *IEEE International Conference on Image Processing*, vol. 3, Oct. 1995, 444-447.

Simoncelli, E. P., Freeman, W. T., Adelson, E. H., and Heeger, D. J., "Shiftable Multi-Scale Transforms," *IEEE Transactions on Information Theory*, 38, 2, Mar. 1992, 587-607.

Tritton, D. J., "Physical Fluid Dynamics," *Oxford, University Press*, 2nd edition, 1988, 544 pages (table of contents included only) Nov. 1988.

Unser, M., Sage, D., and Van De Ville, D., Multiresolution Monogenic Signal Analysis Using the Riesz-Laplace Wavelet Transform, *IEEE Transactions on Image Processing*, 18, 11, Nov. 2009, 2402-2418.

Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, 80:1-80:9.

Wu, H.-Y., Rubinstein, M., Shih, E., Guttag, J., Durand, F., and Freeman, W. T., "Eulerian Video Magnification for Revealing Subtle Changes in the World," *ACM Trans. Graph. (Proc. SIGGRAPH)* 31, 4, Jul. 2012, 65:1-65:8.

Rubinstein, M., "Analysis and Visualization of Temporal Variations in Video," PhD Thesis, Massachusetts Institute of Technology, Feb. 2014, 118 pages.

Belaid, A., Boukerroui, D., Maingourd, Y., Lerallut, J.-F., "Phase Based Level Set Segmentation of Ultrasound Images," *IEEE International Conference on Information Technology and Applications in Biomedicine*, 5 pages, Nov. 2009.

Larkin, K.G., Bone, D.J., and Oldfield, M.A., "Natural demodulation of two-dimensional fringe patterns. I. General background of the spiral phase quadrature transform," *Journal of the Optical Society of America A (JOSA A)*, 18(8): 1862-1870, Aug. 2001.

Wadhwa, N., Rubinstein, M., Durand, F., and Freeman, W.T., "Quaternionic Representation of the Riesz Pyramid for Video Magnification," Technical Report, MIT Computer Science and Artificial Intelligence Laboratory, retrieved from the Internet URL: http://people.csail.mit.edu/nwadhwa/riesz-pyramid/quaternionMM.pdf, Apr. 2014.

Wadhwa, N., Rubinstein, M., Durand, F., and Freeman, W.T., "Riesz Pyramids for Fast Phase-Based Video Magnification," *2014 IEEE International Conference on Computational Photography (ICCP)*, May 2014.

Do, M.N., and Vetterli, M., "Frame reconstruction of the Laplacian pyramid," *2001 IEEE International Conference on Acoustics, Speech, and Signal Processing*, vol. 6, pp. 3641-3644, May 2001.

Karasaridis, A. and Simoncelli, E., "A Filter Design Technique for Steerable Pyramid Image Transforms," *1996 IEEE International Conference on Acoustics, Speech, and Signal Processing*, vol. 4, pp. 2387-2390, May 1996.

\* cited by examiner

RIESZ PYRAMIDS FOR FAST PHASE-BASED VIDEO MAGNIFICATION

RELATED APPLICATION

This application claims the benefit of U.S. Provisional Application Ser. No. 61/925,283, filed on Jan. 9, 2014. The entire teachings of the above application are incorporated herein by reference.

GOVERNMENT SUPPORT

This invention was made with Government support under Grant No. IIS-1111415 awarded by the National Science Foundation. The Government has certain rights in the invention.

BACKGROUND OF THE INVENTION

Numerous phenomena exhibit small motions that are invisible to the naked eye. By the application of computational amplification, such motions may be revealed, so that the motions may be visible to the naked eye.

Manipulating the local phase in coefficients of a complex steerable pyramid decomposition of an image sequence is an effective, robust method of amplifying small motions in video, but complex steerable pyramids may be overcomplete (for example, 21 times overcomplete) and costly to construct, using either a large number of filter taps (where a filter taps may correlate to coefficients of the filter, as known in the art) or a frequency domain construction where care is preferably taken to avoid spatial wrap-around artifacts.

However, the overcompleteness and high cost of implementing an existing complex steerable pyramid make existing phase-based video magnification slow to compute and nontrivial to implement in real time.

SUMMARY OF THE DISCLOSURE

Some embodiments remedy the above-mentioned deficiencies. In order to provide an approach to implement phase-based video magnification in real time, some embodiments include a novel compact image pyramid representation, the Riesz pyramid, that may be used for real-time, high-quality phase-based video magnification. In some embodiments, the Riesz pyramid may be suitable for Eulerian phase-based video magnification, but the Riesz pyramid representation may also be less overcomplete than even the smallest two orientation, octave-bandwidth complex steerable pyramid and may be implemented using compact, efficient linear filters in the spatial domain. For non-limiting example, the Riesz pyramid may be less overcomplete than the complex steerable pyramid (see for example, the following publications which are hereby incorporated by reference in their entirety herein: Simoncelli, E. P. , Freeman, W. T. , Adelson, E. H., and Heeger, D. J., "Shiftable Multi-Scale Transforms," *IEEE Trans. on Info. Theory*, 38, 2, Mar. 1992, 587-607; and Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9).

Some embodiments may produce motion magnified videos that may be of comparable quality to those using the complex steerable pyramid, using the Riesz pyramid image representation. In some embodiments, the Riesz pyramid may be combined with phase-based video magnification. In some embodiments, an advantage of the Riesz pyramid may be that it may phase-shift image features along their dominant orientation, as opposed to the complex steerable pyramid which may phase-shift image features along every orientation.

In some embodiments, the use of the Riesz pyramid representation produces motion magnified videos that are of comparable quality to videos produced using a complex steerable pyramid, but the videos of the Riesz pyramid may be processed in one quarter of the time, making some embodiments more suitable for real-time or online processing than the existing complex steerable pyramid.

In some embodiments, the construction (and/or processing) of the Riesz pyramid includes breaking the input image into non-oriented frequency sub-bands (and/or bands) using an efficient, invertible replacement for the Laplacian pyramid and then taking an approximate Riesz transform of each frequency sub-band (see for example, the following publications that are hereby incorporated by reference in their entirety herein: Burt, P. and Adelson, E., "The Laplacian Pyramid As A Compact Image Code," *IEEE Trans. Comm.*, 31, 4, Apr. 1983, 532-540; and Felsberg, M. and Sommer, G., "The Monogenic Signal," *IEEE Transactions on Signal Processing*, 49, 12, Dec. 2001, 3136-3144). In some embodiments, the image processing using the Riesz pyramid may be performed in the spatial domain, thereby providing an efficient and easy mechanism to avoid the spatial wrap-around artifacts that may be present in a comparable frequency domain implementation, such an eight-orientation complex steerable pyramid (see for example, which is hereby incorporated by reference in its entirety herein, Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9).

In some embodiments, building and collapsing the Riesz pyramid may be efficiently implemented because of shared computation between bands, symmetry of its filters, and also because the Riesz transform may be approximated by filters (preferably two three tap finite difference filters). Some embodiments may use less than half the number of real multiplies, compared with a spatial domain implementation of a two-orientation real steerable pyramid (see for example, the following publication, which is hereby incorporated by reference in its entirety herein: Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447, which may include the smallest possible real steerable pyramid and which may require additional processing in order to compute the imaginary part of the real steerable pyramid).

At least one key insight into why the some embodiments that include the Riesz pyramid representation may be used for motion magnification, is that in some embodiments the Riesz transform is a steerable Hilbert transformer that enables computation of a quadrature pair that is 90 degrees out of phase with respect to the dominant orientation at every pixel of a given image. As such, some embodiments may enable phase shifting and translation of image features in the direction of the dominant orientation at every pixel, as opposed to a sampling of orientations like in the complex steerable pyramid. Felsberg and Sommer introduce the Riesz transform to the signal processing community (see the following publication, incorporated herein by reference in its entirety: Felsberg, M. and Sommer, G., "The Monogenic Signal," *IEEE Transactions on Signal Processing*, 49, 12, Dec. 2001, 3136-3144) and the Riesz transform is extended (see for example, the following publication that is hereby incorporated by reference in its entirety herein: Unser, M., Sage, D., and Van De Ville, D., Multiresolution Monogenic Signal Analysis Using the Riesz-Laplace Wavelet Transform," *IEEE Transactions on Image Processing,* 18, 11, Nov. 2009, 2402-2418, hereinafter "Unser"), into a multiresolution framework. Some embodiments extend Unser. By contrast to Unser, which includes a framework that is preferably not focused on speed and is implemented entirely in the frequency domain, some embodiments may include a Riesz pyramid that is implemented in the spatial domain. In addition, some embodiments may provide further speedups by approximating the Riesz transform using two three tap finite difference filters, by contrast with Unser which merely uses the slower-to-compute ideal frequency domain version of the Riesz transform.

Some embodiments may include a computer-implemented method of rendering a video display, comprising computer-implemented steps, by a processor and associated memory. The method may begin by receiving a video stream formed of a sequence of one or more frames, each frame having image content. For each given frame of the sequence of frames, the method may perform the following steps. First, the method may generate a first set of images, each image of the first set corresponding to the given frame, and each image of the first set including a unique spatial frequency band. Next, the method may downsample at least one image of the first set one or more times. The method then may apply a Riesz transform to at least one of the downsampled images. Then, the method may generate an image representation, based upon the application of the Riesz transform. The image representation may include a second set of images. At least one image of the second set may be horizontally phase shifted with respect to at least one (and/or a given) corresponding image of the first set. The image representation also may include a third set of images. At least one image of the third set may be vertically phase shifted with respect to at least one (and/or a given) corresponding image of the first set. The method may compute a local phase for at least one image of the image representation. The method may generate a temporally filtered local phase based upon applying one or more temporal band pass filters to the local phase. The method may generate an updated image representation based upon the temporally filtered local phase and the at least one image of the image representation.

In some embodiments, the method may generate the temporally filtered local phase based upon applying the one or more temporal band pass filters to the local phase and based upon one or more previous local phases that are associated with one or more previous image representations.

The method may amplify one or more images of the updated image representation. The method may construct a given replacement image based upon the amplified image representation. The replacement image may correspond to the given frame. The replacement image may exhibit amplified motions as compared with the given frame. In addition, the method also may display the given replacement image.

In some embodiments, a user may select one or more preferred temporal frequencies of the image representation, and then some embodiments may apply the selected temporal frequencies to the one or more temporal band pass filters. The one or more temporal band pass filters may include at least one noise filter. Some embodiments may apply one or more noise filters to the temporally filtered image representation, and at least one of the one or more noise filters may perform spatial blurring of the temporally filtered image representation. In some embodiments, the spatial blurring may be weighted (e.g., include one or more weights). In some embodiments, the one or more weights may include a value (and/or quantity) of the amplitude and/or local amplitude A, including, but not limited to the local amplitude A of Equation 3 to follow. Some embodiments may spatially denoise the temporally filtered image representation (and/or phase signal) with an amplitude-weighted spatial blur applied to one or more sub-bands of the temporally filtered image representation.

Some embodiments may generate the first set of images and/or downsample the first set of images based on a Laplacian Pyramid. The Riesz transform may include two three-tap linear filters. The video display may include a real-time video display. The video display may include a two-dimensional (2D) video display. The video display may include an image display. The video stream may include an image stream.

In some embodiments, for each given frame of the sequence of frames, the method may generate an output video stream, the output video stream including each given replacement image that corresponds to each given frame of the sequence of frames. In some embodiments, one or more of the above-mentioned computer-implemented method steps may be performed at a speed that is at least a factor of three and a half (3.5) compared with, and with equivalent visible quality to, a method for motion amplification that uses a complex steerable pyramid.

Some embodiments may include a computer-implemented system for rendering a video and/or image display. The system may include a receiving module configured to receive a video stream formed of a sequence of one or more frames, each frame having image content. The system may also include a computing module, and, for each given frame of the sequence of frames, the computing module may be configured to perform the following operations. First, the computing module may be configured to generate a first set of images, each image of the first set may correspond to the given frame, and each image of the first set may include a unique spatial frequency band. Next, the computing module may be configured to downsample at least one image of the first set one or more times. The computing module may be configured to apply a Riesz transform to at least one of the downsampled images. The computing module may also be configured to generate an image representation, based upon the application of the Riesz transform. The image representation may include a second set of images. At least one image of the second set may be horizontally phase shifted with respect to at least one (and/or a given) corresponding image of the first set. The image representation may include a third set of images. At least one image of the third set may be vertically phase shifted with respect to at least one (and/or a given) corresponding image of the first set. The computing module may be configured to compute a local phase for at least one image of the image representation. The computing module may also be configured to generate a temporally filtered local phase based upon applying one or more temporal band pass filters to the local phase. The computing module may be configured to generate an updated image representation based upon the temporally filtered local phase and the at least one image of the image representation. The computing module may also be configured to amplify one or more images of the updated image representation. The computing module may also be configured to construct a given replacement image based upon the amplified image representation, the replacement image may correspond to the given frame. The replacement image may exhibit amplified motions as compared with the given frame. The system may also include a display module that may be configured to display the given replacement image.

In some embodiments of the system, the computing module may be further configured to select, by a user, one or more preferred temporal frequencies of the image representation, and apply the selected temporal frequencies to the one or more temporal band pass filters. The one or more temporal band pass filters may include at least one noise filter. The computing module may be further configured to apply one or more noise filters to the temporally filtered image representation. At least one of the one or more noise filters may be configured to perform spatial blurring of the temporally filtered image representation. In some embodiments, the spatial blurring may be weighted (e.g., include one or more weights). In some embodiments, the one or more weights may include a value (and/or quantity) of the amplitude and/or local amplitude A, including, but not limited to the local amplitude A of Equation 3 to follow. Some embodiments may spatially denoise the temporally filtered image representation (and/or phase signal) with an amplitude-weighted spatial blur applied to one or more sub-bands of the temporally filtered image representation. In addition, the computing module may be further configured to generate the first set of images and/or downsample the first set of images based on a Laplacian Pyramid.

In some embodiments of the system, the Riesz transform may include two three-tap linear filters. The video display may include a real-time video display. The video display may include a two-dimensional (2D) video display. The video display may include an image display and the video stream includes an image stream. The computing module may be further configured to generate, for each given frame of the sequence of frames, an output video stream. The output video stream may include each given replacement image that corresponds to each given frame of the sequence of frames.

Some embodiments are directed to a non-transitory computer readable medium having stored thereon a sequence of instructions which, when loaded and executed by a processor coupled to an apparatus, causes the apparatus to: receive a video stream formed of a sequence of one or more frames, each frame having image content; for each given frame of the sequence of frames: generate a first set of images, each image of the first set corresponding to the given frame, and each image of the first set including a unique spatial frequency band; downsample at least one image of the first set one or more times; apply a Riesz transform to at least one of the downsampled images; generate an image representation, based upon the application of the Riesz transform, the image representation including a second set of images, at least one image of the second set being horizontally phase shifted with respect to at least one (and/or a given) corresponding image of the first set, the image representation including a third set of images, at least one image of the third set being vertically phase shifted with respect to at least one (and/or a given) corresponding image of the first set; compute a local phase for at least one image of the image representation; generate a temporally filtered local phase based upon applying one or more temporal band pass filters to the local phase; generating an updated image representation based upon the temporally filtered local phase and the at least one image of the image representation; amplify one or more images of the updated image representation; construct a given replacement image based upon the amplified image representation, the replacement image corresponding to the given frame and the replacement image exhibiting amplified motions as compared with the given frame; and display the given replacement image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Some embodiments may include a new representation (including, but not limited, to the Riesz pyramid image representation) that may be used for video magnification. Some advantages of some embodiments include, but are not limited to: (a) less overcompleteness than even a two orientation octave-bandwidth pyramid, (b) implementation in the spatial domain, which gives an easy way to avoid spatial wrap-around artifacts associated with frequency domain implementations of filters, (c) implementation with efficient, compact linear filters, and (d) support for real-time phase-based video magnification. Some embodiments produce high-quality motion-magnified videos quickly and also may run on new sequences, thereby showing new results, and providing a real-time implementation. Note that some embodiments may process images in real-time, including, but not limited to, processing one image frame at a time, as opposed to requiring multiple input image frames prior to image processing. Note also that videos are results are available on the project website (see, for example, the following publications which are hereby incorporated by reference in their entirety herein: "Applicants' Presentation Overview," "Applicants' Video—Wine Glass," "Applicants' Presentation," and "Applicants' Videos in Presentation," all available on the Internet at people.csail.mit.edu, under the directory "nwadhwa," followed by the sub-directory "riesz-pyramid," May 2014). Comparisons for some embodiments with state-of-the-art video magnification are made to follow and results on new video sequences are also shown to follow.

Figure 1A:
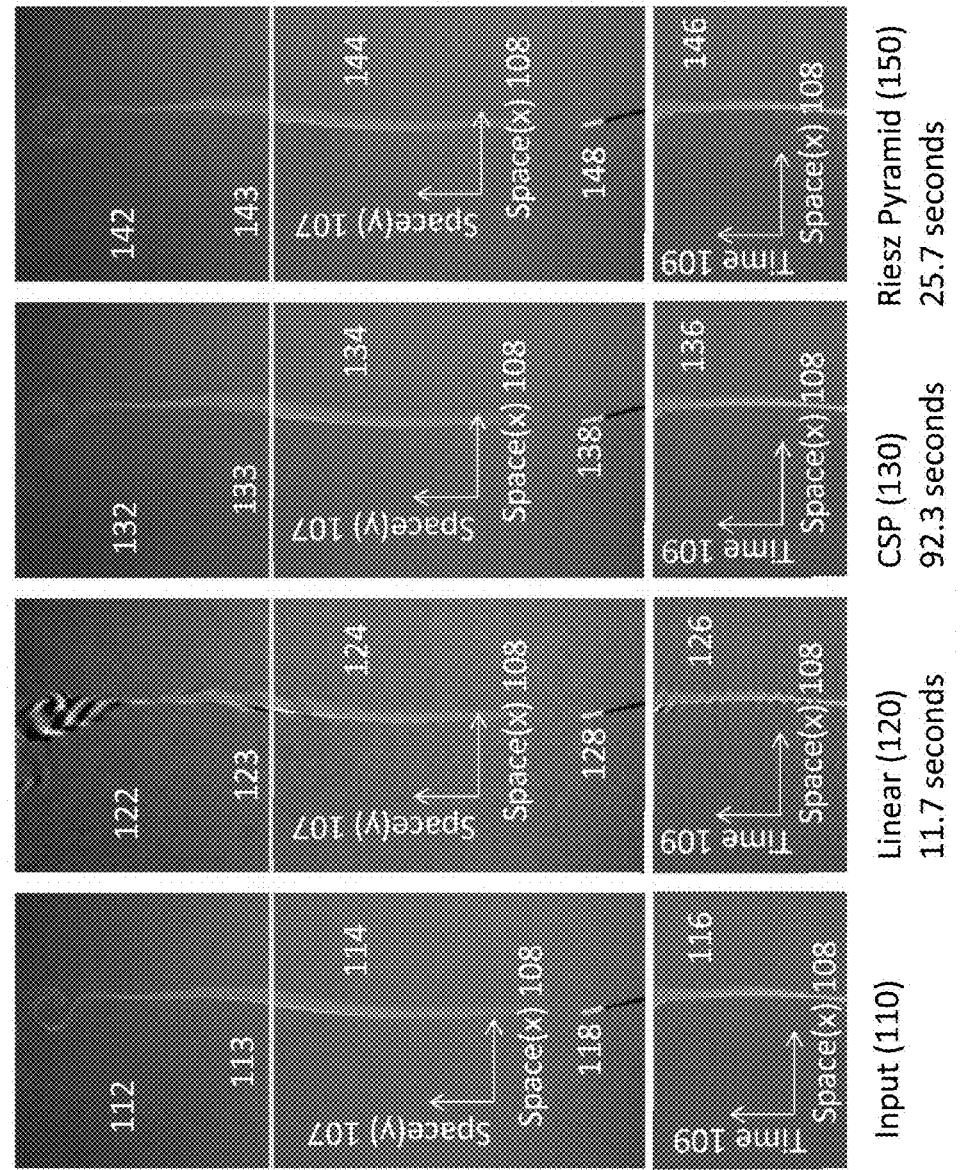
FIG. 1A illustrates motion magnification of sinusoidal instabilities in fluid flow during the transition from laminar flow to turbulent flow and a corresponding motion magnification comparison between existing approaches and an embodiment that includes a Riesz pyramid.

FIG. 1A illustrates the method and system 150 presented by Applicants that may take one or more image frames as input (e.g., the input image including image frames 112 and 114 which may be interconnected by the highlighted time slice 113) and create one or more output image frames (e.g., the output image including image frames 142 and 144 which may be interconnected by the highlighted time slice 143) that may illustrate amplified (e.g., magnified) motion. FIG. 1A also may illustrate motion magnification of sinusoidal instabilities in fluid flow during the transition from laminar flow to turbulent flow for a given object (see the given objects 118, 128, 138, and 148, respectively). The input 110 may be motion magnified using a linear method 120 (see the following publication, which is hereby incorporated by reference in its entirety herein: Wu, H.-Y., Rubinstein, M., Shih, E., Guttag, J., Durand, F., and Freeman, W. T., "Eulerian Video Magnification for Revealing Subtle Changes in the World," *ACM Trans. Graph.* (*Proc. SIGGRAPH*) 31, 4, Jul. 2012, 65:1-65) and with two phase-based methods, first with the eight orientation octave-bandwidth complex steerable pyramid (CSP) 130 used in Wadhwa (hereby incorporated by reference in its entirety herein: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9) and second with an embodiment with a method (and/or system) 150 that may include Applicants' new Riesz pyramid representation. For the linear method 120, please refer to the image frames 122 and 124 which may be interconnected by the highlighted time slice 123. For the CSP method 130, please refer to the image frames 132 and 134 which may be interconnected by the highlighted time slice 133.

As illustrated in FIG. 1A, the quality of the video produced using the embodiment with a method (and/or system) 150 may be comparable to that produced using the complex steerable pyramid method 130, but the embodiment with a method (and/or system) 150 may produce the video approximately four times faster than the complex steerable pyramid method 130.

According to some embodiments, the input image (112 and 114), the linear image (122 and 124), the CSP image (132 and 134), and/or the Riesz pyramid image (142 and 144) may be considered to include a vertical space axis (y-axis) 107 and a horizontal space axis (x-axis) 108. According to some embodiments, each of the images 116, 126, 136, 146 may be considered to include a vertical time axis (z-axis) 109 and a horizontal space axis (x-axis) 108.

As such, according to some embodiments, each given time slice in FIG. 1A (113, 123, 133, and 143) may correspond to a given respective image (116, 126, 136, and 146, respectively). For non-limiting example, each time slice in FIG. 1A (113, 123, 133, and 143) may be considered to represent its respective image (116, 126, 136, or 146, respectively) when shifted in position by 90 degrees along the z-axis (time) 109. For non-limiting example, each given time slice (113, 123, 133, and 143) may be equivalent to its respective image (116, 126, 136, or 146, respectively), when rotated 90 degrees inward (and/or outward) along the z-axis (time) 109.

In some embodiments, Applicants' method and/or system 150 may be implemented in MATLAB. As such, FIG. 1A also illustrates corresponding MATLAB run times for image processing for the Linear approach 120 (11.7 seconds), CSP 130 (92.3 seconds), and the embodiment including the Riesz Pyramid method (and/or system) 150 (25.7 seconds, which is about four times faster than the corresponding time for CSP 130). Note that both CSP 130 and the Riesz Pyramid method (and/or system) 150 do not have the intensity clipping artifacts and comparatively lesser amplification of the Linear method 120.

Figure 1B:
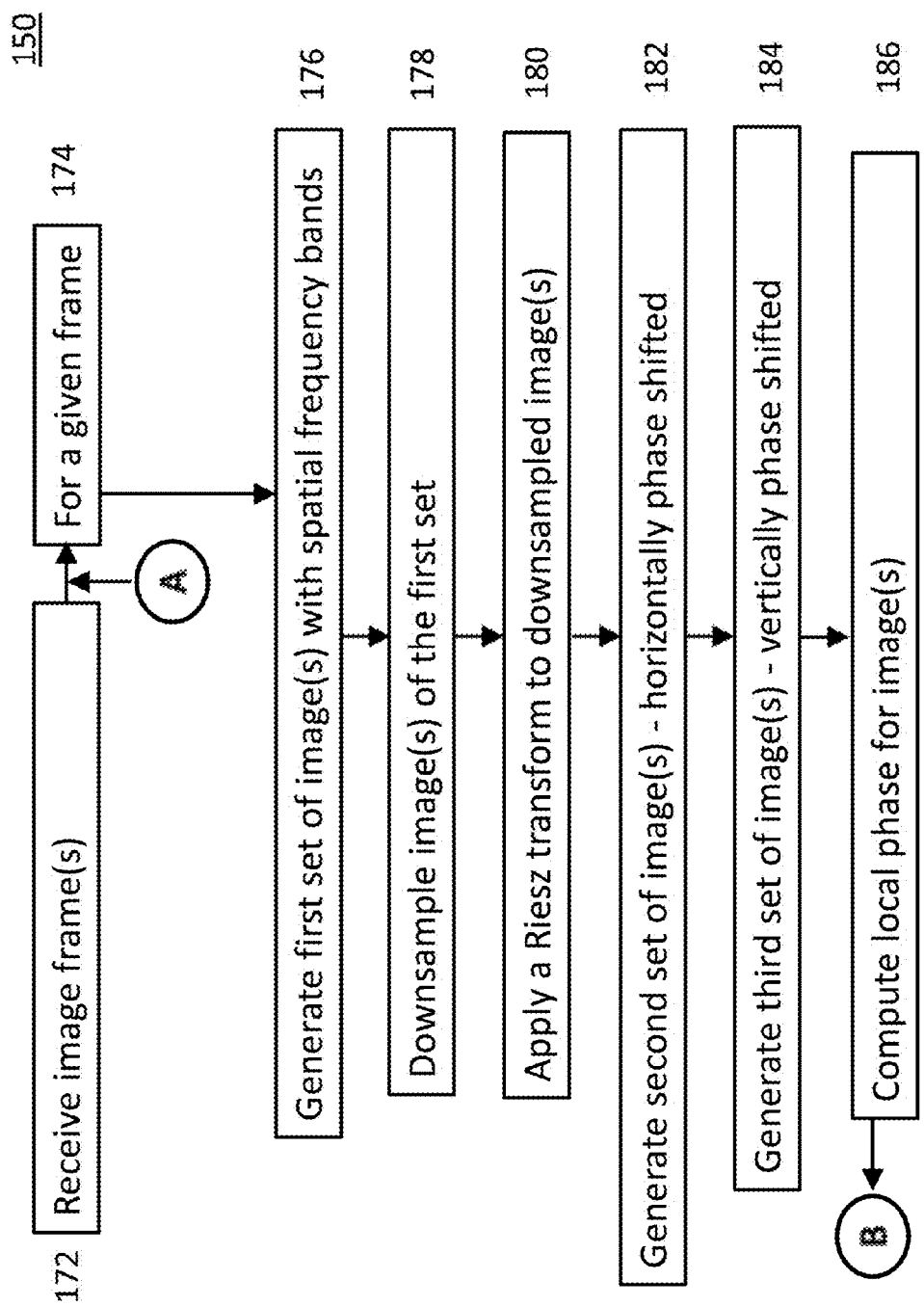
FIGS. 1B-1C are flowcharts directed to generating motion magnified images according to some embodiments.
Figure 1C:
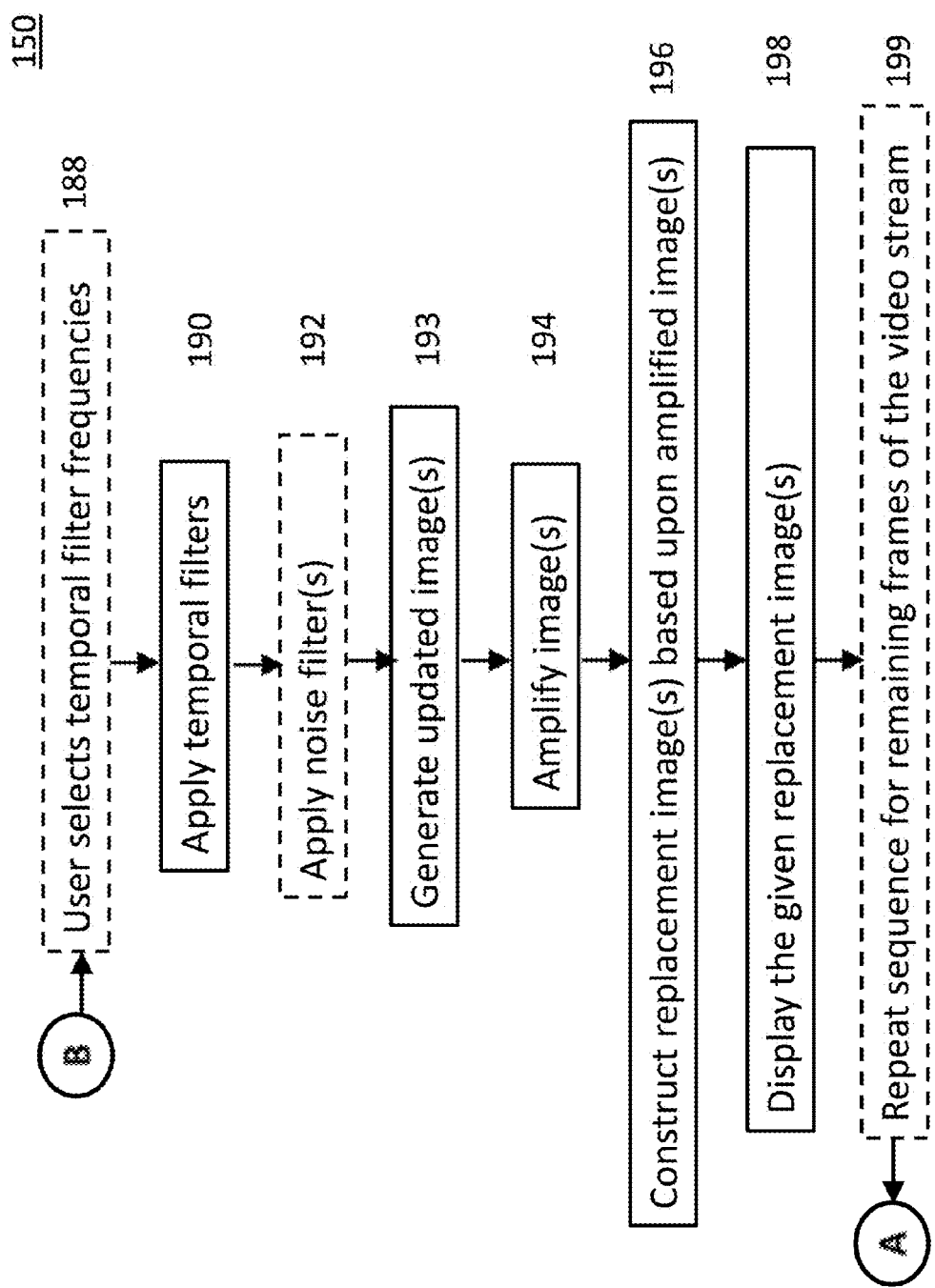

FIGS. 1B-1C illustrate a non-limiting flow-chart of some embodiments that include the method (and/or system) 150 of FIG. 1A. As illustrated in FIGS. 1B-1C, some embodiments may include a computer-implemented method (and/or system) 150 of rendering a video (and/or image) display, comprising computer-implemented steps, by a processor and associated memory. The method 150 may begin by receiving a video (and/or image) stream 172 formed of a sequence of one or more frames, each frame having image content. For each given frame 174 (e.g., each original input frame) of the sequence of frames, the method may perform the following steps. First, the method may generate a first set of images 176. Each image of the first set may correspond to the given frame, and each image of the first set may include a unique spatial frequency band. According to some embodiments, the first set of images may include an image with a high frequency component, and an image with a low frequency component. According to some embodiments, each image of the first set of images may correspond to each given frequency that exists in the original input frame. Next, the method may downsample 178 at least one image of the first set one or more times. In some embodiments, the method may downsample the low frequency component, thereby producing additional images with successively lower frequency components as part of the downsampling process. In some embodiments, the method may downsample one or more of the at least one images of the first set, the downsampling occurring one or more times. Optionally, the method 150 may generate 176 the first set of images and downsample 178 the first set of images based on a Laplacian Pyramid.

As illustrated in FIG. 1B, the method then may apply a Riesz transform 180 to one or more of the downsampled images. Optionally, the Riesz transform 180 may include linear filters, including, but not limited to, two three-tap linear filters (and/or finite differences), which may include, but are not limited to, finite impulse response (FIR) filters, infinite impulse response (IIR) filters and/or other types of filters. These two three-tap finite difference filters may include taps of $[0.5, 0, -0.5]$ and $[0.5, 0, -0.5]^T$, which are illustrated in more detail in FIG. 3D to follow. These filters may filter spatial frequencies (described in more detail to follow).

Referring back to FIG. 1B, next, the method (and/or system) 150 then may generate an image representation (182, 184), based upon the application of the Riesz transform of step 180. The image representation may include a second set of images, as in step 182. At least one image of the second set may be horizontally phase shifted with respect to at least one corresponding image of the first set. The image representation also may include a third set of images step 184, and at least one image of the third set being vertically phase shifted with respect to at least one corresponding image of the first set.

Please note that according to some embodiments, the above-mentioned FIG. 1B steps 172 (receiving image frames) through 184 (generating the third set of images) are described in greater detail in FIG. 2, FIGS. 3A-3D, and their corresponding textual descriptions.

Next, as illustrated in FIG. 1B, the method may compute a local phase 186 for at least one image of the image representation. In some embodiments, Equation 6 and/or Equation 11 to follow may be included in the computation of local phase 186.

Next, as illustrated in FIG. 1C, optionally, a user may select one or more preferred temporal frequencies 188. The temporal frequencies may correspond to the local phase (and/or to the image representation). The method (and/or system) 150 then may apply 190 the temporal frequencies (that are selected in step 188 or automatically determined) to one or more temporal band pass filters. In step 190, the method 150 may generate a temporally filtered local phase based upon applying one or more temporal band pass filters to the local phase. Optionally, step 190 may generate a temporally filtered local phase. The generation may be based upon applying one or more temporal band pass filters to the local phase. The generation also may be based upon a previous local phase that may be associated with a previous image representation that may be generated by a Riesz transform. The one or more temporal band pass filters may include at least one noise filter. Optionally, the method 150 may also apply one or more noise filters 192 to the temporally filtered image representation. At least one of the one or more noise filters 192 may perform spatial blurring of the temporally filtered image representation. In some embodiments, the spatial blur may be weighted (e.g., include one or more weights). In some embodiments, the one or more weights may include a value (and/or quantity) of the amplitude and/or local amplitude A, including, but not limited to the local amplitude A of Equation 3 to follow. Next, in step 193, the method may also generate an updated image representation based upon the temporally filtered local phase and at least one image of the current image representation.

Please note that according to some embodiments the above-mentioned FIG. 1B-1C steps 188 (selection of temporal filter frequencies) through 193 (generating one or more updated images) are described in greater detail to follow at least at the following: herein at the section titled "Filtering of Quaternionic Phase" and including Equations Q17-Q22; and also at Section 4.1, including Equations 17-22, of the following publication, which is incorporated in its substance herein, and is also incorporated by reference in its entirety herein: Wadhwa, N., Rubinstein, M., Durand, F., and Freeman, W. T., "Quaternionic Representation of the Riesz Pyramid for Video Magnification," Technical Report, MIT Computer Science and Artificial Intelligence Laboratory, April 2014.

As illustrated in FIG. 1C, the method may amplify 194 one or more images of the updated image representation. Please note that according to some embodiments, the FIG. 1C step 194 (amplifying one or more images) is described in greater detail to follow at least at the following: herein at the section titled "Amplification;" and also at Section 4.2 of the following publication, which is incorporated in its substance herein, and is also incorporated by reference in its entirety herein: Wadhwa, N., Rubinstein, M., Durand, F., and Freeman, W. T., "Quaternionic Representation of the Riesz Pyramid for Video Magnification," Technical Report, MIT Computer Science and Artificial Intelligence Laboratory, April 2014.

Next, as illustrated in FIG. 1C, the method may construct 196 a given replacement image based upon the amplified image representation. The replacement image may correspond to the given frame. The replacement image may exhibit amplified motions as compared with the given frame. Please note that according to some embodiments, step 196 of FIG. 1C is described in more detail, at least herein at FIG. 3C and its corresponding textual description, and also at Section 1 of the following publication, which is incorporated in its substance herein, and is also incorporated by reference in its entirety herein: Wadhwa, N., Rubinstein, M., Durand, F., and Freeman, W. T., "Supplemental for Riesz Pyramids for Fast Phase-Based Video Magnification," retrieved from the Internet at people.csail.mit.edu under the directory "nwadhwa," followed by the sub-directory "riesz-pyramid," as the file "RieszPyrSupplemental.zip," May 2014.

In addition, the method also may display 198 the given replacement image. The video display 198 may include a real-time video display. The video display 198 may also include a two-dimensional (2D) video display. The video display 198 may include an image display. The video stream may include an image stream.

Optionally, for each given frame of the sequence of frames, the method 150 may repeat 199 the sequence of steps 172 through 198 on one or more images of the video (and/or) image stream (as illustrated in FIGS. 1B-1C) in order generate an output video stream. In some embodiments, one or more images of the output video stream may include one or more given replacement images that may correspond to each given frame of the sequence of frames. In some embodiments each of the output video stream images may include one or more given replacement images that may correspond to each given frame of the sequence of frames.

In some embodiments, the computer-implemented steps of the method 150 may be performed at a speed that is at least a factor of three and a half (3.5) compared with, and with equivalent visible quality to, a method for motion amplification that uses a complex steerable pyramid.

Background—Local Phase and Quadrature Pairs

In some embodiments, phase-based video magnification preferably relies on manipulation of the local (e.g., spatial) phase in image sub-bands. The local phase may be used to edit local motions in a manner analogous to shifting an image using global phase via the Fourier shift theorem (see for example, the following publication incorporated herein by reference in its entirety herein: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, July 2013, 80:1-80:9).

In some embodiments, the local phase of an image sub-band may be computed by first computing the sub-band's quadrature pair, a 90 degree phase-shifted version of the sub-band related to it by the Hilbert transform. The sub-band and its quadrature pair may form the real and imaginary part of a complex number, whose argument is the local phase. Some embodiments may manipulate the local phase in order to shift the sub-band. For non-limiting example, the quadrature pair of cos(x) may be sin(x), its corresponding local phase may be x, and $$\cos(x-\phi) = \mathrm{Real}(e^{-i\phi}(\cos(x)+i\sin(x))) \qquad (1)$$

may be a translation of cos(x).

Using the above equation, images (including, but not limited to two-dimensional images) which are composed of multiple sub-bands (e.g., scales), may be analyzed using a complex steerable pyramid (e.g., an invertible filter bank) that first breaks the image into sub-bands corresponding to different scales and orientations to form the real part (e.g., real component) of the pyramid. Then, the imaginary part (e.g., imaginary component) of the pyramid is formed by taking the Hilbert transform of each sub-band along the sub-band's orientation.

The complex steerable pyramid must break the image into at least two orientations because the Hilbert transform is fundamentally a one-dimensional transform and in two dimensions the Hilbert transform may be well-defined with respect to a preferred orientation. Therefore, in contrast to some embodiments, the complex steerable requires multiple orientations which is why the complex steerable pyramid is so overcomplete.

Riesz Transform

The Riesz transform is a rotation-invariant, two-dimensional generalization of the one dimensional Hilbert transform (see for example, the following publication, which is hereby incorporated by reference in its entirety herein: Felsberg, M. and Sommer, G., "The Monogenic Signal," *IEEE Transactions on Signal Processing*, 49, 12, Dec. 2001, 3136-3144). The Riesz transform may be viewed as a steerable Hilbert transformer that provides a way to compute a quadrature pair of a non-oriented image sub-band that is 90 degrees phase-shifted with respect to the dominant orientation at a given point of the image sub-band. As such, in some embodiments, the Riesz transform enables phase analysis of image non-oriented sub-bands, e.g., without having to break the image sub-bands into multiple orientations. The Riesz transform may be applied to image processing applications, including, but not limited to, segmentation of ultrasound images (see for example, which is hereby incorporated by reference in its entirety herein: Belaid, A., Boukerroui, D., Maingourd, Y., Lerallut, J.-F., "Phase Based Level Set Segmentation of Ultrasound Images," *IEEE Trans. Inf. Technol. Biomed.*, 5 pages, November 2009) and demodulation of fringe patterns in interferometric images (see for example, which is hereby incorporated by reference in its entirety herein: Larkin, K. G., Bone, D. J., and Oldfield, M. A., "Natural demodulation of two-dimensional fringe patterns. I. General background of the spiral phase quadrature transform," *Journal of the Optical Society of America A (JOSA A)*, 18(8): 1862-1870, August 2001).

In some embodiments, following the analysis in Unser (Unser, M., Sage, D., and Van De Ville, D., Multiresolution Monogenic Signal Analysis Using the Riesz-Laplace Wavelet Transform," *IEEE Transactions on Image Processing*, 18, 11, Nov. 2009, 2402-2418), in two dimensions, the Riesz transform may have a transfer function:

$$\frac{-i\omega_x + \omega_y}{\|\vec{\omega}\|} \tag{1b}$$

that may also be represented as the following transfer function:

$$\frac{-i\omega_x}{\|\vec{\omega}\|}, \frac{-i\omega_y}{\|\vec{\omega}\|} \tag{2}$$

Figure 2:
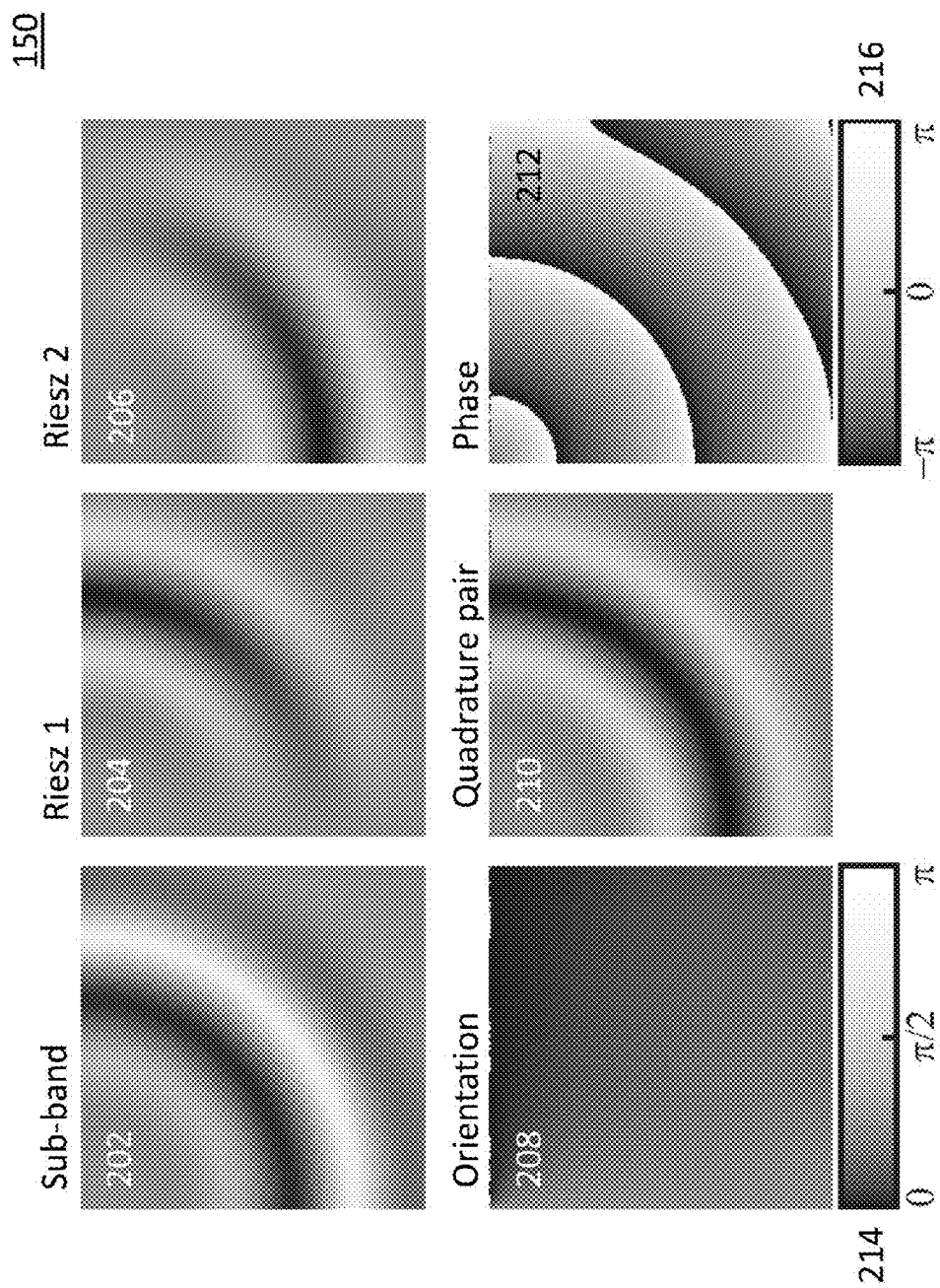
FIG. 2 illustrates Riesz pyramid image results according to some embodiments, including an image sub-band, its Riesz transform, and the corresponding orientation, quadrature pair and phase.

FIG. 2 provides an illustration of a frequency sub-band of a given input image (202), its corresponding Riesz transform (204, 206) and the corresponding orientation (208), quadrature pair (210) and phase (212). In some embodiments, if the transfer function (from Equation 1b and/or Equation 2 above) is applied to the image sub-band I (202) in FIG. 2, the result is a pair of filter responses ($R_1$, $R_2$), or alternatively $R_1+iR_2$, in FIG. 3A (204, 206, respectively). The input I and Riesz transform R=$R_1$+i$R_2$=($R_1$, $R_2$) together may form a triple called the monogenic signal (hereby incorporated by reference in its entirety herein: Felsberg, M. and Sommer, G., "The Monogenic Signal," *IEEE Transactions on Signal Processing*, 49, 12, Dec. 2001, 3136-3144). The monogenic signal may be converted to spherical coordinates to yield the local amplitude A, local orientation θ and local phase φ using the equations:

$$I=A\cos(\phi), R_1=A\sin(\phi)\cos(\theta), R_2=A\sin(\phi)\sin(\theta) \tag{3}$$

In some embodiments, the Riesz transform may be steered to an arbitrary orientation $\theta_0$ by means of the equation $e^{-i\theta_0}(R_1+iR_2)$. In some embodiments, the Riesz transform may be steered to an arbitrary orientation $\theta_0$ by multiplication by a rotation matrix $$\begin{pmatrix} \cos(\theta_0) & \sin(\theta_0) \\ -\sin(\theta_0) & \cos(\theta_0) \end{pmatrix} \begin{pmatrix} R_1 \\ R_2 \end{pmatrix} \tag{4}$$

In some embodiments, the Riesz transform may be steered to the local dominant orientation θ (208), resulting in a quadrature pair whose first component Q may be:

$$Q=A\sin(\phi) \tag{5}$$

which may include a quadrature pair of the input signal that is 90 degrees phase-shifted with respect to the local dominant orientation (210). Note, the corresponding second component may be zero. In some embodiments, the local phase φ (212) may be computed as the phase of the complex number $$Ae^{i\phi}=I+iQ \tag{6}$$

whose real and imaginary part are the input sub-band and quadrature pair. Alternatively, in some embodiments, the local phase may be computed directly from Equation 11 to follow. As also illustrated in FIG. 2, in some embodiments, respective frequency scales (214, 216) may be associated with the corresponding dominant orientation θ (208) and local phase φ (212), respectively. Further details regarding the Riesz transform and some embodiments that may use quaternions is presented to follow herein in the Sections titled "Quaternionic Representation" and "Quaternionic Representation of Riesz Pyramid," and also in Applicants' technical report, which is hereby incorporated by reference in its entirety herein: Wadhwa, N., Rubinstein, M., Durand, F., and Freeman, W. T., "Quaternionic Representation of the Riesz Pyramid for Video Magnification," Technical Report, MIT Computer Science and Artificial Intelligence Laboratory, retrieved from the Internet at people.csail.mit.edu under the directory "nwadhwa," followed by the sub-directory "riesz-pyramid," as the file "quaternionMM.pdf," April 2014.

Eulerian Video Magnification

In Lagrangian approaches to motion magnification (see for example, the following publication, that is hereby incorporated by reference in its entirety herein: Liu, C., Torralba, A., Freeman, W. T., Durand, F., and Adelson, E. H., "Motion Magnification," *ACM Trans. Graph.*, 24, 3, Jul. 2005, 519-526), motion may be computed explicitly and the frames of the video may be warped accordingly. Motion estimation, however, remains a challenging and computationally intensive task. Eulerian video magnification, introduced by Wu (the following publication is hereby incorporated by reference in its entirety herein: Wu, H.-Y., Rubinstein, M., Shih, E., Guttag, J., Durand, F., and Freeman, W. T., "Eulerian Video Magnification for Revealing Subtle Changes in the World," *ACM Trans. Graph.* (*Proc. SIGGRAPH*) 31, 4, Jul. 2012, 65:1-65:8), is able to amplify small motions in videos without explicitly computing optical flow. In Wu, the temporal brightness changes in frame sub-bands may be amplified to amplify image motions. Because the method of Wu may amplify brightness changes, the total amplification may be low and noise power may be amplified linearly with an amplification factor.

In some embodiments, the above-mentioned deficiencies of linear video magnification are remedied by Wadhwa (the following publication that is hereby incorporated by reference in its entirety herein: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9), by amplifying temporal phase variations in the coefficients of a complex steerable pyramid instead of intensity variations. Several techniques demonstrate that the local phase in bandpass filtered videos may be used for motion estimation (see for example, the following publications which are hereby incorporated by reference in their entirety herein: Fleet, D. J. and Jepson, A. D, "Computation of Component Image Velocity from Local Phase Information," *International Journal of Computer Vision,* 5, 1, Aug.1990, 77-104; and Gautama, T. and Van Hulle, M., "A Phase-Based Approach to the Estimation of the Optical Flow Field Using Spatial Filtering," *IEEE Transactions on Neural Networks,* 13, 5, Sep. 2002, 1127-1136) and in some embodiments, Wadhwa shows that this link between phase and motion may be exploited in an Eulerian manner for the purpose of motion magnification (the following publication is hereby incorporated by reference in its entirety herein: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9).

While the method of Wadhwa is of much higher quality than its predecessor, it may be slower to compute because the eight orientation complex steerable pyramid representation it uses is over 21 times overcomplete. In contrast to the method of Wadhwa, an advantage of some embodiments that use a Riesz pyramid is that they are 4 times overcomplete. As such, some embodiments are even less overcomplete than the 5⅓times overcomplete two orientation octave-bandwidth complex steerable pyramid, which may be the smallest complex steerable pyramid.

In Wadhwa, half and quarter octave bandwidth pyramids may be used to amplify motions more than is required to obtain visible amplification using a comparable octave bandwidth representation. These half and quarter octave representations may be approximately a factor of 1.5 and 2.6 more overcomplete than their octave bandwidth counterpart and as a result may be significantly slower to compute. In contrast to Wadhwa, some embodiments may improve speed of computation and eliminate overcompleteness that may result due to the multiple orientations of a complex steerable pyramid. As such, some embodiments may provide an octave-bandwidth Riesz pyramid. To follow, comparisons are made between complex steerable pyramids and some embodiments that include Riesz pyramids.

Riesz Pyramids and Motion Magnification

Figure 3A:
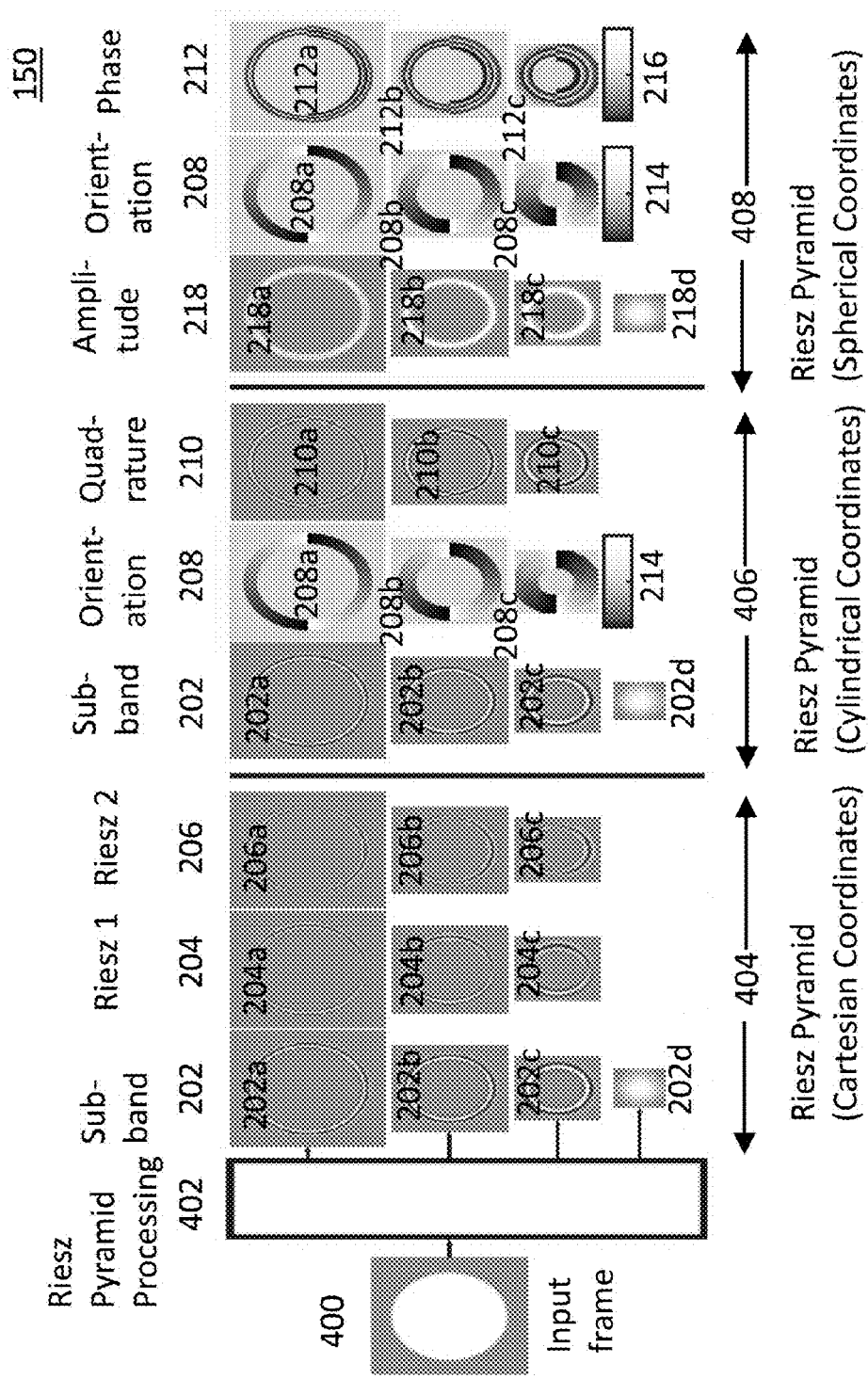
FIG. 3A illustrates a Riesz pyramid image results with cartesian coordinates, cylindrical coordinates, and spherical coordinates, according to some embodiments.

In some embodiments, the Riesz pyramid may represent the image as an invertible pyramid, plus a fast, approximate Riesz transform of each level (e.g., frequency sub-band). FIG. 3A to follow illustrates how an input sub-band and the Riesz transform may be used to compute the local orientation, a quadrature pair to the input sub-band that may be 90 degrees out of phase with respect to the local orientation and consequently the local amplitude and phase. The implementation of the Riesz pyramid is described to follow. In some embodiments, the Riesz pyramid may include an efficient, invertible, non-oriented octave-bandwidth pyramid and an efficient approximation to the Riesz transform. In addition, the local phase and local orientation of the Riesz pyramid may be used for phase-based motion processing that is of comparable quality to phase-based motion processing with a complex steerable pyramid (see for example, the following publication hereby incorporated by reference in its entirety herein: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9), but much quicker.

As illustrated in FIG. 3A, some embodiments may include a Riesz pyramid that may use the Riesz transform to perform phase analysis on scales of an input image, by first decomposing the input image 400 into multiple sub-bands (202*a*, 202*b*, 202*c*, collectively 202), each given sub-band (of 202*a*, 202*b*, and 202*c*) corresponding to a different scale, and then taking the Riesz transform of each given sub-band (202*a*, 202*b*, 202*c*) in order to obtain Riesz 1 (204*a*, 204*b*, 204*c*, collectively 204) and Riesz 2 (206*a*, 206*b*, 206*c*, collectively 206) image representations. Although three succeeding images are shown for each scale (referring to the three images 202*a*, 202*b*, and 202*c*), embodiments are not so limited and a different number of succeeding images may be used in embodiments represented herein.

FIG. 3A illustrates three equivalent representations (404, 406, 408) that may be computed 402 in some embodiments using a Riesz pyramid. Some embodiments may include one or more of these three equivalent representations (404, 406, 408).

An input frame 400 is illustrated in FIG. 3A as a circle with a sharp edge. As illustrated in FIG. 3A, in some embodiments, the input 400 may be decomposed 402 into frequency sub-bands 202 using an invertible transform (in Riesz pyramid processing 402), and an approximate Riesz transform may also be taken in the Riesz pyramid processing 402 for each sub-band 202, in order to form a Riesz pyramid (which may include 202, 204, and/or 206, respectively). According to some embodiments, the Riesz pyramid processing may also be equivalent to steps 176 through 186 of FIG. 1B.

Some embodiments may process 402 a given input frame 400, and the processing 402 may result in multiple frequency sub-bands 202. An image corresponding to one frequency sub-band 202 may be produced for each given frequency of the given input frame 400. For non-limiting example, FIG. 3A illustrates a set of three images 202*a*, 202*b*, 202*c*, each of which may correspond to a unique (and/or different) frequency of the multiple frequency sub-bands 202. Although FIG. 3A depicts three sub-band images 202*a*, 202*b*, 202*c*, it is understood that the processing 402 of FIG. 3A may be applied to produce more or less frequency sub-band images of the given input frame 400.

As illustrated in FIG. 3A, some embodiments may decompose the original input image 400 into a sub-band image of a high frequency and a low frequency. According to some embodiments, the low frequency may be 202*a*. The sub-band image 202*b* may include a frequency divided by a factor of two as compared with the low frequency 202*a*. Successive sub-band images may include successively lower frequencies (based upon a factor of two, but not so limited to that factor), e.g. 202*c*, followed by 202*d* respectively. Note that instead of using a factor of two for frequency division, some embodiments are not so limited and may use a factor of N (real or integer multiple) for frequency division. Preferably, subbands are not produced for frequencies that are too low and result in aliasing (see elements 202d and 218d, which are preferably not used for processing because the frequency may be too low which may result in aliasing).

Using downsampling, according to some embodiments, as illustrated in FIG. 3A, for a given frequency sub-band, resulting images 202 may include a N×N image 202a (for example, a 100×100 pixel image), and a lower-scale (e.g., scaled down) N/2×N/2 pixel image 202b (for example, a corresponding 50×50 pixel image), and an even lower-scale N/4×N/4 pixel image 202c (for example, a corresponding 25×25 pixel image), but the resulting images do not include images with resolution that is too low (202d) for sampling purposes. As such, the images represented in FIG. 3A may have different scales (for non-limiting example, comparing the N×N scale of 202a with the N/2×N/2 scale of 202b and the N/4×N/4 scale of 202c). In some embodiments, as image size may be scaled down by a factor of two (but it is not so limited to a factor of two) between succeeding images (for non-limiting example, referring to images 202a scaled down to 202b, which is then scaled down to 202c). In other embodiments an image size may be scaled down by a real and/or images factor other than two between succeeding images.

According to some embodiments, for a given sub-band 202, the resulting images 202 may be downsampled into images with successively lower resolution through processing 402 (preferably, by a factor of two, but not so limited) until a given minimum resolution is obtained. In some embodiments the minimum resolution may be ten pixels in a given dimension, for non-limiting example, resulting in an image 202c of 10×10 pixels. In some embodiments, the minimum resolution may be N×N pixels. According to some embodiments, the sub-band image 202a may not be downsampled, the sub-band image 202b may be downsampled with respect to sub-band image 202a, the sub-band image 202c may be downsampled with respect to sub-band image 202b, and the sub-band image 202d may be downsampled with respect to sub-band image 202c. According to other embodiments, the sub-band images 202a, 202b, 202c of FIG. 3A are understood to each be downsampled images. According to some embodiments, the sub-band image 202c may be downsampled to the minimum resolution (and in some embodiments downsampled to a resolution that is above the minimum resolution).

In some embodiments, at each scale, the three channels (202, 204, 206) may represent components in Cartesian coordinates 404. Components may be expressed in cylindrical coordinates 406 to show the sub-band 202, its quadrature pair 210 (collectively, 210a, 210b, 210c in FIG. 3A) and the local orientation 208 (collectively, 208a, 208b, 208c in FIG. 3A). Components may be expressed in spherical coordinates 408 to show the local amplitude 218 (collectively, 218a, 218b, 218c of FIG. 3A), local orientation (collectively, 208a, 208b, 208c of FIG. 3A with a corresponding frequency scale 214) and local phase 212 (collectively, 212a, 212b, and 212c of FIG. 3A with a corresponding frequency scale 216). In FIG. 3A, according to some embodiments, the discontinuity in the orientation 208, quadrature pair 210 and phase 212 may be due to the fact that the orientation may wrap around from 0 to π. In some embodiments, each of the three representations (404, 406, 408) may include a lowpass residual and the Riesz transform may not be applied to the lowpass residual. In some embodiments, the orientation 208 and/or the phase 216 may not be applicable in regions of low amplitude. As illustrated in FIG. 3A, elements including but not limited to elements 208a, 208b, 208c, 212a, 212b, and 212c may exhibit a lighter shading in comparison to the other darker shaded elements, including, but not limited to 202, 204, 206, 210, and 218. As illustrated in FIG. 3A through the lighter shading in elements 208a, 208b, 208c, 212a, 212b, and 212c, the regions of low amplitude (e.g. lighter shading) may be inside of and/or outside of the circles that are present in elements 208a, 208b, 208c, 212a, 212b, 212c.

In some embodiments, an ideal version of the Riesz pyramid may be constructed in the frequency domain using octave (or sub-octave) filters similar to the ones proposed in Wadhwa (Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, 80:1-80:9) and the frequency domain Riesz transform (see for example, which is hereby incorporated by reference in its entirety herein: Felsberg, M. and Sommer, G., "The Monogenic Signal," *IEEE Transactions on Signal Processing*, 49, 12, Dec. 2001, 3136-3144). This may be used to magnify motions in videos faster than a two orientation complex steerable pyramid, but it requires the use of costly Fourier transforms to construct, making it unsuitable for online processing. To remedy this deficiency and gain further speedups, some embodiments approximate the ideal frequency domain Riesz transform with an approximate Riesz transform given by two finite difference filters, which is significantly more efficient to compute. To avoid using the Fourier transform in the initial spatial decomposition, some embodiments also introduce a new non-oriented pyramid implemented in the spatial domain, similar to the Laplacian pyramid (see for example, which is hereby incorporated by reference in its entirety herein: Burt, P. and Adelson, E., "The Laplacian Pyramid As A Compact Image Code." *IEEE Trans. Comm.*, 31, 4, Apr. 1983, 532-540), but preferably with wider filters that support a wider range of motion editing. The approximate Riesz transform and the spatial decomposition is described further in the sections to follow.

Figure 3B:
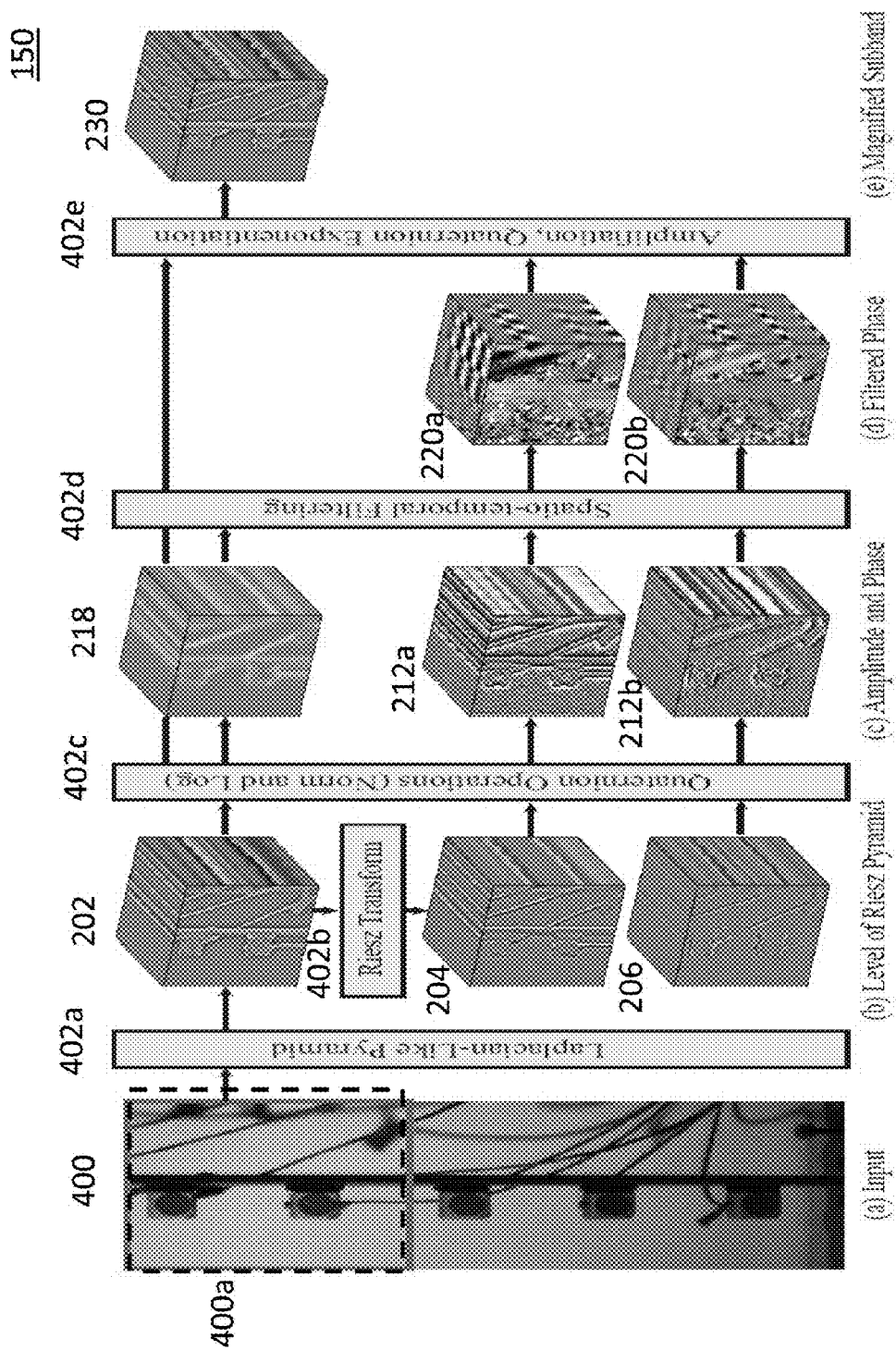
FIG. 3B illustrates a processing pipeline for motion magnification that includes a Riesz pyramid, according to some embodiments.

In addition, according to some embodiments, FIG. 3B illustrates a processing pipeline for motion magnification with the Riesz pyramid. A region of interest 400a (highlighted with a dashed box) of an input 400 may be decomposed using a Laplacian-like pyramid 402a (one level shown). In some embodiments, the input image 400 may be two-dimensional, including, but not limited to having dimensions that may include an x-axis (e.g., horizontal), and a y-axis (e.g., vertical). Although the preferred embodiment includes a input image 400 of two dimensions, one skilled in the art realizes that embodiments may include an input image 400 having three or more dimensions. For non-limiting example, one skilled in the art realizes that three-dimensional and/or four-dimensional input images may include, but are not limited to, having dimensions that may include an x-axis (e.g., horizontal), a y-axis (e.g., vertical), a z-axis, and/or time. According to some embodiments, the Riesz transform 402b of this level 202 is taken to produce the Riesz pyramid (204, 206). The quaternion norm 402c may be used to compute the amplitude (218) and the quaternion logarithm may be used to compute the quaternionic phase (212a, 212b). The quaternionic phase may be spatio-temporally filtered (220a, 220b) through a spatio-temporal filter 402d to isolate motions of interest, and the result may be used to phase-shift the input Riesz pyramid level 402e to produce a motion magnified subband (230).

In some embodiments, these magnified subbands 230 of FIG. 3B may be collapsed to produce a motion magnified image and/or video. For non-limiting example, in some embodiments, the motion magnified subbands 230 of FIG. 3B (which may correspond to the images 440a, 440b, and/or 440c of FIG. 3C) may be collapsed (in FIG. 3C, using the elements 430, 432, and/or 436 illustrated to the right of images 440a, 440b, and 440c) into an output image (and/or frame) with motion magnification (referring to element 450 of FIG. 3C).

Figure 3C:
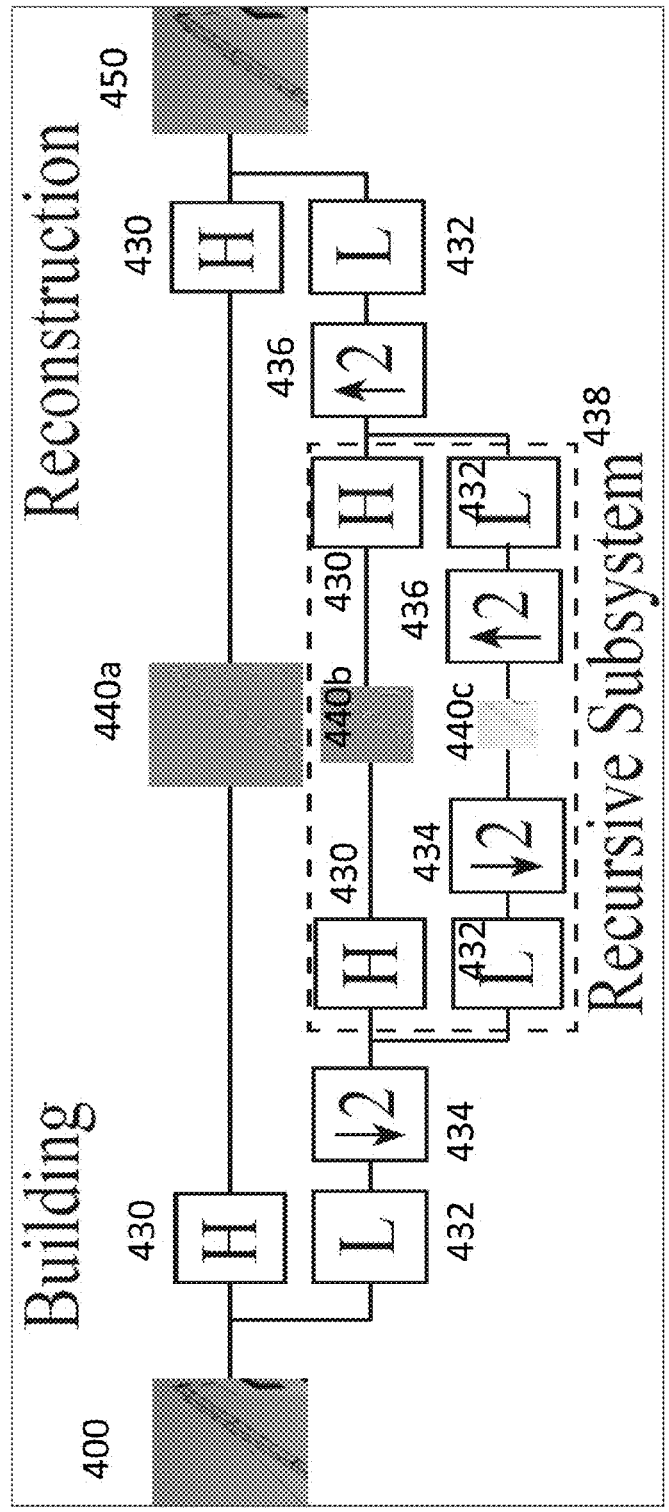
FIG. 3C illustrates a signal processing diagram of Riesz pyramid construction and reconstruction according to some embodiments.

FIG. 3C is a signal processing diagram of an embodiment that illustrates how a given input image frame 400 may be converted to an output frame with motion magnification 450. The signal processing diagram includes a Riesz pyramid construction, illustrating how one or more lowpass filters 432 and/or highpass filters 430 may be recursively applied with subsampling to produce a sequence of critically sampled bandpassed images. The blocks ↓2 (elements 434) denote downsampling and ↑2 (elements 436) denote upsampling by a factor of 2 in both x and y image directions. L (432) and H (430) denote linear shift invariant lowpass and highpass filters respectively. Elements 440a, 440b, 440c denote intermediate images (image representations in between the input image 400 and output image that has magnified motions 450).

Replacement for Laplacian Pyramid

In addition, some embodiments may include a method of designing a new pyramid like the Laplacian pyramid, but with a better inverse. Some embodiments may be inspired by Simoncelli and Freeman and may use the corresponding constraints and motivation (see for example, which is hereby incorporated by reference in its entirety herein: Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447). According to some embodiments their techniques may be used to design a one-dimensional version of a Riesz pyramid. In some embodiments, the Riesz pyramid may be converted to a two-dimensional pyramid using the McClellan transform (see for example, hereby incorporated by reference in its entirety herein: J. S. Lim, Two-dimensional signal and image processing, Englewood Cliffs, N.J., Prentice Hall, 694 pages, September, 1989), that may be more efficient to compute than Simoncelli and Freeman's original replacement with non-separable filters.

The Laplacian pyramid may decompose an image into subbands corresponding to different scales (Burt, P. and Adelson, E., "The Laplacian Pyramid As A Compact Image Code". *IEEE Trans. Comm.*, 31, 4, Apr. 1983, 532-540). In some embodiments, it does this by decomposing an image into the sum of a high frequency component and a low frequency component. The low frequency component may then be downsampled and the decomposition may be recursively applied to the downsampled image. The levels of the pyramid form an overcomplete representation of the image, in which each level corresponds to a different set of spatial frequencies. The pyramid may be inverted by upsampling the lowest level, adding it to the second lowest level to form a new lowest level on which the inversion process may then be recursively applied.

While the inversion may be exact when the Laplacian pyramid representation of the image is unmodified, it may be less than ideal when the pyramid is modified, such as for the purposes of image compression or phase-based video magnification (see for example, which is hereby incorporated by reference in its entirety herein: Do, M. N., and Vetterli, M., "Frame reconstruction of the Laplacian pyramid," *Acoustics, Speech, and Signal Processing*, 2001 IEEE International Conference on. volume 6, pages 3641-3644, May 2001). Viewing the modifications as noise and the Laplacian pyramid as a linear transform T, then the mean squared error optimal inverse may be the pseudoinverse $(T^T T)^{-1} T^T$. When the downsampling and upsampling filters are separable Gaussian blurs, the inverse described in the previous paragraph may not be the pseudoinverse and is therefore may be suboptimal. In addition, the pseudoinverse may be difficult to compute directly due to the matrix multiplications and inversions.

As a result, some embodiments include a design with a new pyramid in which $T^T T = I$, so that the pseudoinverse may simply be the transpose of the transform. In some embodiments, this is accomplished by adopting a the construction scheme (see for example, which is hereby incorporated by reference in its entirety herein: Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447), in which T is chosen such that $T^T T = I$ and both T and $T^T$ may be evaluated using a series of recursively applied convolutions and subsampling operations.

Referring to FIG. 3C, some embodiments include a pyramid that is constructed using a highpass filter $h_H[n]$ (element 430) and a lowpass filter $h_L[n]$ (element 432). The image may be highpassed 430 to form the top level of the pyramid. Then, it is lowpassed 432 and downsampled 432. The decomposition may be recursively applied, as indicated in the recursive subsystem 438, to the downsampled image (440b, 440c) to build the pyramid. The transpose of this operation when viewed as a matrix multiplication is to upsample 436 the downsampled image, lowpass 432 it again and then add it to a highpassed version 430 of the next level up. In some embodiments, the inverse reconstructs the input image well the frequency responses of the lowpass 432 and highpass 430 filters, $H_L(\omega)$ and $H_H(\omega)$ preferably satisfy $$|H_L(\omega)|^2 + |H_H(\omega)|^2 = 1 \tag{S1}$$

In some embodiments, so that the downsampled images are not aliased, the additional requirement is imposed that $$|H_L(\omega)| = 0 \text{ for } |\omega| > \pi/2 \tag{S2}$$

In some embodiments, the pyramid construction of FIG. 3C is different than Simoncelli and Freeman (see for example, which is hereby incorporated by reference in its entirety herein: Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447) because a 1D pyramid is designed and then converted to 2D using the McClellan transform. This enables evaluation of the filters in an efficient manner as described below.

Some embodiments follow the publications, which are incorporated by reference in its entirety herein: Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447, and Karasaridis, A. and Simoncelli, E., "A Filter Design Technique For Steerable Pyramid Image Transforms," Acoustics, Speech, and Signal Processing, 1996 IEEE International Conference on. volume 4, pages 2387-2390, May 1996, and find filters that satisfy these constraints by setting up an optimization problem in which the deviation from Equation S1 and Equation S2 is penalized by the $L^1$ norm. That is, the mean of the deviation may be penalized. Constraints may be included to ensure that the lowpass filter has energy near the DC component and that the highpass filter has energy near the Nyquist frequency. Some embodiments minimize this objective function using MATLAB's "fminunc" function to provide the filters $h_L$, and $h_H$ shown in Table 1(a) to follow.

After designing the 1D filters, they may be converted to 2D filters using the McClellan transformation (see for example, which is hereby incorporated by reference in its entirety herein: J. S. Lim, Two-dimensional signal and image processing, Englewood Cliffs, N.J., Prentice Hall, 694 pages, September, 1989) which converts a 1D symmetric FIR filter into a 2D FIR filter, which is approximately radially symmetric. The frequency response of a one dimensional filter $h_L[k]$ with 2N+1 taps may be written as a trigonometric polynomial:

$$H_L(\omega) = \sum_{k=-N}^{N} h_L[k]\cos(k\omega) = \sum_{n=0}^{N} b_L[n](\cos(\omega))^n \quad (S3)$$

where $b_L[n]$ may be determined by $h_L[k]$ via Chebyshev polynomials (see for example, which is hereby incorporated by reference in its entirety herein: J. S. Lim, Two-dimensional signal and image processing, Englewood Cliffs, N.J., Prentice Hall, 694 pages, September, 1989).

In the McClellan transformation, the $\cos(\omega)$ may be replaced by a 3×3 two dimensional filter $t[x, y]$ with frequency response $T(\omega_x, \omega_y)$. The result may be a 2D filter:

$$H_L(\omega_x, \omega_y) = \sum_{k=0}^{N} b_L[k](T(\omega_x, \omega_y))^n \quad (S4)$$

that has contours lines equal to those of $T(\omega_x, \omega_y)$. Some embodiments may include a choice for t that is the 3×3 filter specified in Table 1(b). In this case, $T(\omega_x, \omega_y)$ may be approximately circularly symmetric.

Equation S4 suggests an efficient way to jointly lowpass and highpass an image. Specifically, the input image $i[x, y]$ may be repeatedly convolved with t, N times to yield the quantities:

$$i, t*i, \ldots, \underbrace{t* \ldots *t}_{N \text{ times}} *i \quad (S5)$$

or in the frequency domain $$I(\omega_x, \omega_y), T(\omega_x, \omega_y)I(\omega_x, \omega_y), \ldots, T(\omega_x, \omega_y)^N I(\omega_x, \omega_y) \quad (S6)$$

From this and Equation S4, it becomes clear that a linear combination may be taken of Equation S5 to get the lowpass and highpass filter responses. The linear combination coefficients may be $b_L[k]$ for the lowpass filter and $b_H[k]$ for the highpass filter. Note that $b_L$, $b_H$ and the full 9×9 filter taps are shown in Table 1(c-e).

Figure 5A:
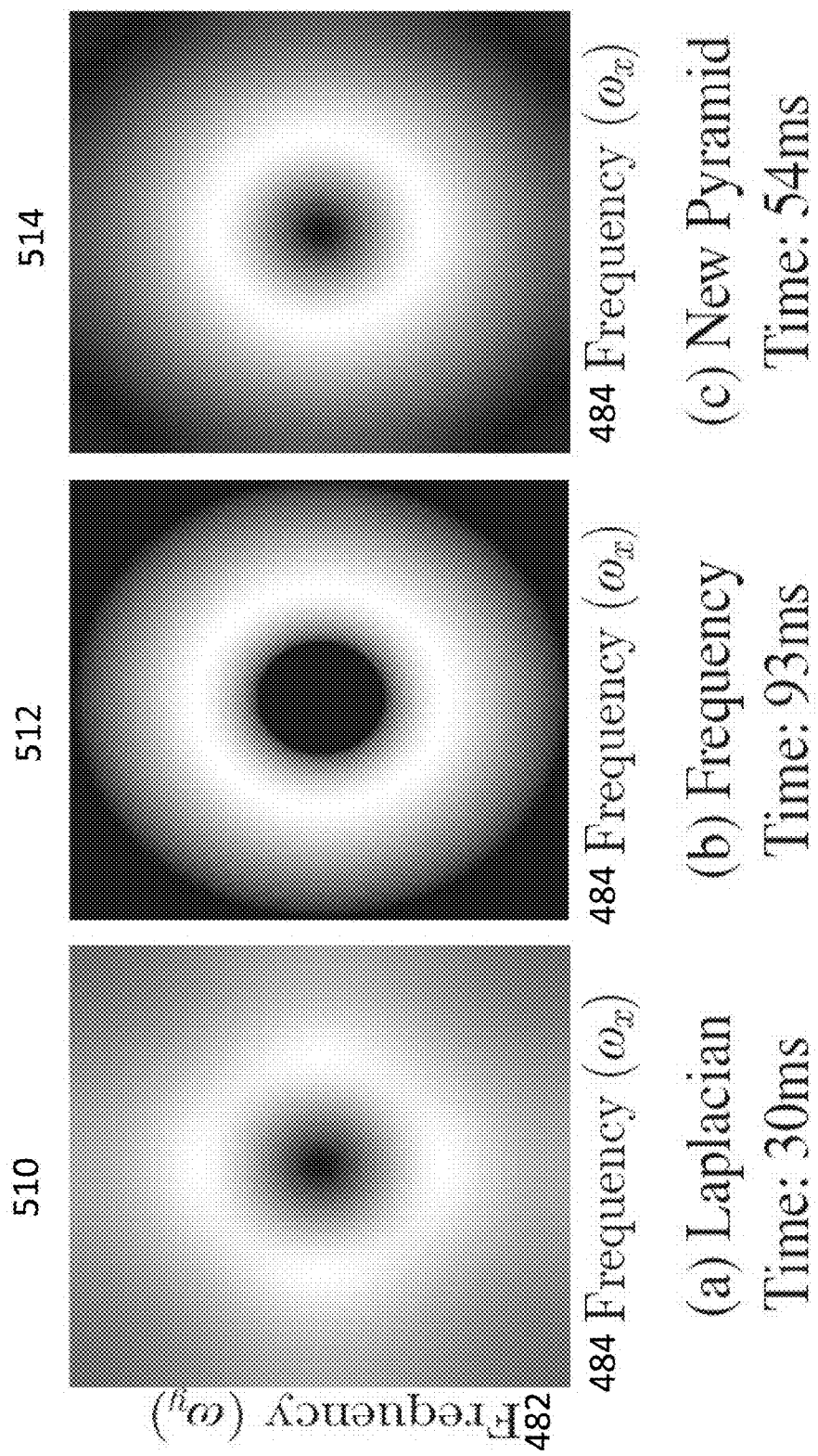
FIGS. 5A-5C illustrate different spatial decompositions according to some embodiments.
Figure 5B:
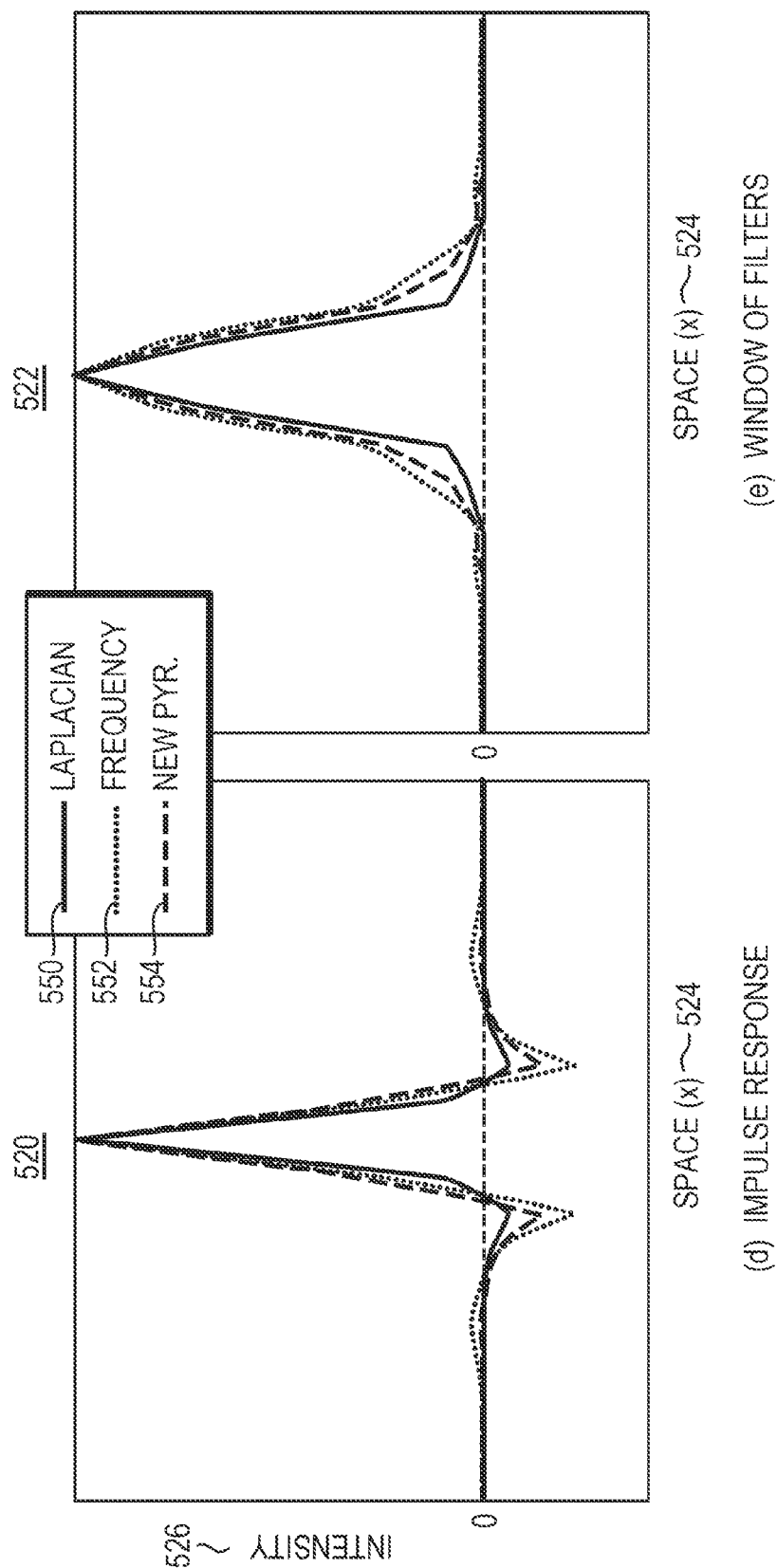
Figure 5C:
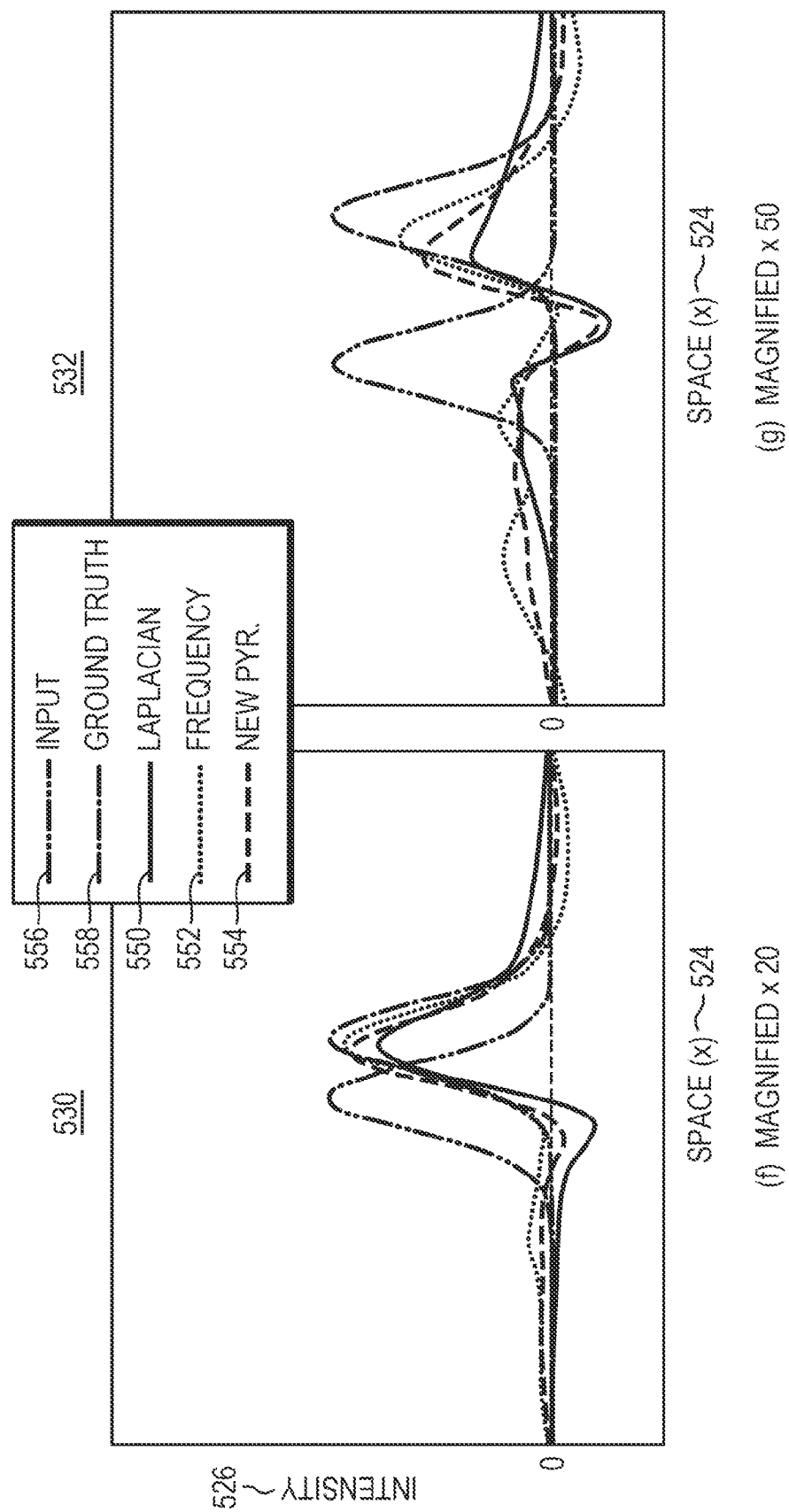

In addition to being invertible, some embodiments include wider filters, which allow for larger amplification factors in phase based motion magnification as described in FIGS. 5A-5C.

TABLE 1

| | | | | | | | | |
|---|---|---|---|---|---|---|---|---|
| Lowpass: | −0.0209 | −0.0219 | 0.0900 | 0.2723 | 0.3611 | 0.2723 | 0.0900 | −0.0219 | −0.0209 |
| Highpass: | 0.0099 | 0.0492 | 0.1230 | 0.2020 | −0.7633 | 0.2020 | 0.1230 | 0.0492 | 0.0099 |

(a) One dimensional filter taps ($h_L[k]$ and $h_H[k]$)

| | | | | | | |
|---|---|---|---|---|---|---|
| 0.125 | 0.250 | 0.125 | Lowpass: | 0.1393 | 0.6760 | 0.6944 | −0.1752 | −0.3344 |
| 0.250 | −0.500 | 0.250 | Highpass: | −0.9895 | 0.1088 | 0.3336 | 0.3936 | 0.1584 |
| 0.125 | 0.250 | 0.125 | | | | | |

(b) t[x, y] (McClellan Transform)  (c) $b_L[k]$ and $b_H[k]$

| | | | | | | | | |
|---|---|---|---|---|---|---|---|---|
| −0.0001 | −0.0007 | −0.0023 | −0.0046 | −0.0057 | −0.0046 | −0.0023 | −0.0007 | −0.0001 |
| −0.0007 | −0.0030 | −0.0047 | −0.0025 | −0.0003 | −0.0025 | −0.0047 | −0.0030 | −0.0007 |
| −0.0023 | −0.0047 | 0.0054 | 0.0272 | 0.0387 | 0.0272 | 0.0054 | −0.0047 | −0.0023 |
| −0.0046 | −0.0025 | 0.0272 | 0.0706 | 0.0910 | 0.0706 | 0.0272 | −0.0025 | −0.0046 |
| −0.0057 | −0.0003 | 0.0387 | 0.0910 | 0.1138 | 0.0910 | 0.0387 | −0.0003 | −0.0057 |
| −0.0046 | −0.0025 | 0.0272 | 0.0706 | 0.0910 | 0.0706 | 0.0272 | −0.0025 | −0.0046 |
| −0.0023 | −0.0047 | 0.0054 | 0.0272 | 0.0387 | 0.0272 | 0.0054 | −0.0047 | −0.0023 |
| −0.0007 | −0.0030 | −0.0047 | −0.0025 | −0.0003 | −0.0025 | −0.0047 | −0.0030 | −0.0007 |
| −0.0001 | −0.0007 | −0.0023 | −0.0046 | −0.0057 | −0.0046 | −0.0023 | −0.0007 | −0.0001 |

(d) Taps for direct form of lowpass filter

| | | | | | | | | |
|---|---|---|---|---|---|---|---|---|
| 0.0000 | 0.0003 | 0.0011 | 0.0022 | 0.0027 | 0.0022 | 0.0011 | 0.0003 | 0.0000 |
| 0.0003 | 0.0020 | 0.0059 | 0.0103 | 0.0123 | 0.0103 | 0.0059 | 0.0020 | 0.0003 |
| 0.0011 | 0.0059 | 0.0151 | 0.0249 | 0.0292 | 0.0249 | 0.0151 | 0.0059 | 0.0011 |
| 0.0022 | 0.0103 | 0.0249 | 0.0402 | 0.0469 | 0.0402 | 0.0249 | 0.0103 | 0.0022 |
| 0.0027 | 0.0123 | 0.0292 | 0.0469 | −0.9455 | 0.0469 | 0.0292 | 0.0123 | 0.0027 |
| 0.0022 | 0.0103 | 0.0249 | 0.0402 | 0.0469 | 0.0402 | 0.0249 | 0.0103 | 0.0022 |
| 0.0011 | 0.0059 | 0.0151 | 0.0249 | 0.0292 | 0.0249 | 0.0151 | 0.0059 | 0.0011 |
| 0.0003 | 0.0020 | 0.0059 | 0.0103 | 0.0123 | 0.0103 | 0.0059 | 0.0020 | 0.0003 |
| 0.0000 | 0.0003 | 0.0011 | 0.0022 | 0.0027 | 0.0022 | 0.0011 | 0.0003 | 0.0000 |

(e) Taps for direct form of highpass filter

Table 2 below includes Riesz transform taps for a few sizes. A Riesz transform filters is shown in Table 2(a). The other Riesz transform filter is given by the corresponding transpose.

| | | | | |
|---|---|---|---|---|
| | | −0.02 | | |
| −0.49 | −0.48 | −0.12 | −0.34 | −0.12 |
| 0.00 | 0.00 | 0.00 | 0.00 | 0.00 |
| 0.49 | 0.48 | 0.12 | 0.34 | 0.12 |
| | | 0.02 | | |
| (a) 3 × 1 | (b) 5 × 1 | | (c) 3 × 3 | |

Table 3 includes the parameters used for each of a set of videos. The phase signal in each video may be temporally filtered, spatially smoothed and then amplified. Note that the spatial smoothing may specify the standard deviation of a amplitude-weighted Gaussian blur filter in pixels.

| Video | Amplification | Temporal band | Frame Rate | Spatial Blur | Temporal filter |
|---|---|---|---|---|---|
| baby | 10x | See Temporal filter | 30 FPS | 2px | Difference of IIR lowpass filters of the form $y_n = r_i y_{n-1} + (1 - r_i) x_n$ with $r_1 = 0.04$ and $r_2 = 0.4$. |
| baby_blanket | 30x | See Temporal filter | 30 FPS | 2px | Difference of IIR lowpass filters of the form $y_n = r_i y_{n-1} + (1 - r_i) x_n$ with $r_1 = 0.04$ and $r_2 = 0.4$. |
| balance | 10x | 1-8 Hz | 300 FPS | 2px | Second order Butterworth bandpass filter applied forwards and then backwards |
| camera | 60x | 36-62 Hz | 300 FPS | 2px | Difference of first order Butterworth lowpass filters |
| column | 30x | 78-82 Hz | 1500 FPS | 3px | Second order Butterworth bandpass filter applied forwards and then backwards |
| crane_crop | 50x | 0.2-0.4 Hz | 24 FPS | 2px | Second order Butterworth bandpass filter applied forwards and then backwards |
| drum | 10x | 74-78 Hz | 1900 FPS | 2px | Second order Butterworth bandpass filter applied forwards and then backwards |
| guitar | 25x | 72-92 Hz | 600 FPS | 2px | 300 Tap FIR filter with circular boundary conditions |
| metal_corner_brace | 100x | See Temporal filter | 10000 FPS | 5px | Acceleration filter (Laplacian of Gaussian filter with Gaussian of std. dev. of 3 frames) |
| smoke | 25x | 9-15 Hz | 200 FPS | 3px | Second order Butterworth bandpass filter applied forwards and then backwards |
| violin | 100x | 340-370 Hz | 5600 FPS | 2px | Second order Butterworth bandpass filter applied forwards and then backwards |

Spatial Decomposition

In some embodiments, prior to applying the Riesz transform, the input image may be spatially decomposed using an invertible image pyramid. In some embodiments, the invertible image pyramid may be a pyramid similar to the non-oriented octave-bandwidth invertible replacement for the Laplacian pyramid proposed by Simoncelli and Freeman (see for example, the following publications, which are hereby incorporated by reference in their entirety herein: Burt, P. and Adelson, E., "The Laplacian Pyramid As A Compact Image Code," *IEEE Trans. Comm.*, 31, 4, Apr. 1983, 532-540; and Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447).

For the purposes of computational performance, embodiments preferably avoid the Fourier transform, thereby eliminating the choice of a frequency domain construction (see FIG. 5A, element 512). Some embodiments may use a compact space-domain image pyramid, the Laplacian pyramid (see for example, hereby incorporated by reference in its entirety herein: Burt, P. and Adelson, E., "The Laplacian Pyramid As A Compact Image Code," *IEEE Trans. Comm.*, 31, 4, Apr. 1983, 532-540), e.g., FIG. 5A, element 510. However, this pyramid may have a narrow impulse response, which may reduce the maxi-mum amplification the pyramid may support (FIGS. 5B-5C, elements 520, 522, 530, 532). To remedy this problem, some embodiments include a self-inverting pyramid similar to the Laplacian pyramid, but preferably with wider impulse response (referring to FIG. 5A, element 514). Simoncelli and Freeman (see for example, hereby incorporated by reference in its entirety herein: Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447) show that such a pyramid may be constructed from a lowpass and highpass filter pair. In some embodiments, the filter pair preferably satisfies certain properties, including Equation 51, Equation S2 and/or Table 1(b).

In some embodiments, rather than using the symmetric, but non-separable lowpass and highpass filter taps provided by Simoncelli and Freeman, a pyramid is designed that uses a similar technique to theirs. In some embodiments, filters may use fewer taps than in Simoncelli and Freeman, and may optionally have additional structure imposed on them, including, but not limited to, the McClellon transform of Table 1(b), Equation S1, and/or Equation S2, which may make the filters efficient to implement when the lowpass and highpass filters are jointly applied to the same input as they are when building the pyramid (see FIGS. 4A-4B) (see for example, the following publication that is hereby incorporated herein by reference in its entirety: J. S. Lim, Two-dimensional signal and image processing, Englewood Cliffs, N.J., Prentice Hall, 694 pages, September, 1989).

Figure 4A:
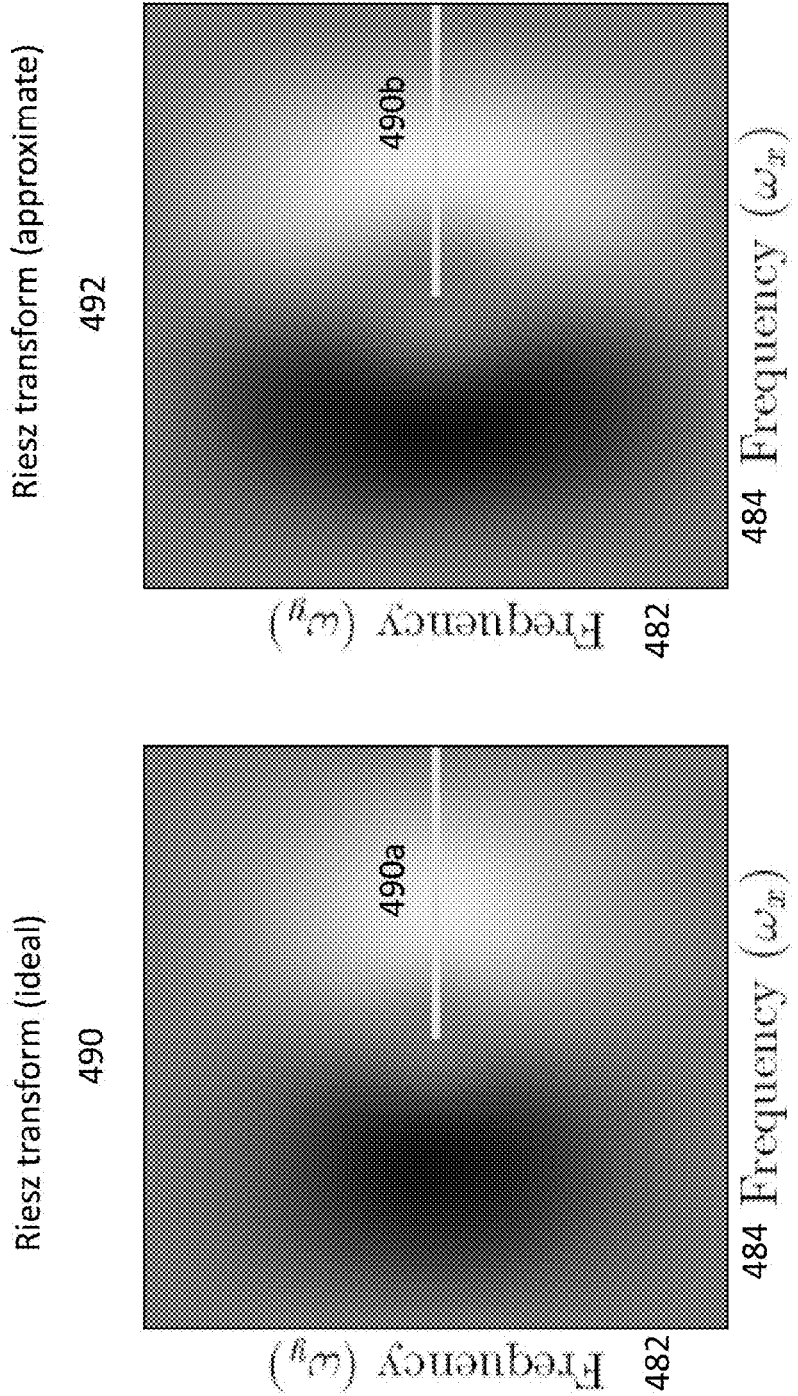
FIGS. 4A-4B illustrate comparisons between approximate and ideal Riesz transforms, according to some embodiments.

FIG. 4A illustrates a comparison between transfer functions of some embodiments, including a comparison between a first channel of an ideal Riesz transform 490 and a first channel of an approximation of the Riesz transform 492. In FIG. 4A, each of the transfer functions 490, 492 is represented with a corresponding y-axis frequency, $\omega_y$ (element 482) and a corresponding x-axis frequency, $\omega_x$, (element 484). The one-dimensional slices 490a, 490b of FIG. 4A (see the highlighted lines 490a and 490b in FIG. 4A) are represented in the FIG. 4B graph of magnitude vs. frequency 494, which shows magnitude 486 and frequency 484 for the corresponding ideal Riesz transform 490 and approximated Riesz transform 492.

In some embodiments, as a result, building the pyramid may use a total of 30 multiplies per pixel per scale. Collapsing the pyramid preferably applies the symmetric lowpass and highpass filter to separate bands and then sums the results for a total of 42 multiplies per pixel per scale. In some embodiments, this may result in a total cost of 72 multiplies per pixel per scale or 96 multiplies per pixel to build and collapse the pyramid.

In some embodiments, the approximate Riesz transform may add 3 multiplies per pixel for a total of 99 multiplies per pixel to build and collapse the pyramid. In contrast, the primal domain two orientation real, not complex, steerable pyramid, proposed by Simoncelli and Freeman, requires 227 multiplies per pixel to build and collapse the pyramid even if symmetry of the filters is exploited (see for example, the following publication hereby incorporated herein in its entirety: Simoncelli, E. P., and Freeman, W. T., "The Steerable Pyramid: A Flexible Architecture for Multi-Scale Derivative Computation," *IEEE International Conference on Image Processing*, vol. 3, October 1995, 444-447).

In some embodiments, the new octave-bandwidth pyramid may be used to replace the Laplacian pyramid in other applications. In addition, a comparison of some embodiments that include a novel new pyramid (e.g., the Riesz pyramid) vs. the Laplacian pyramid is illustrated in FIGS. 5A-5C.

FIGS. 5A-5C illustrate different spatial decompositions for some embodiments. FIG. 5A illustrates the frequency responses of: a level of the Laplacian pyramid 510, a frequency domain pyramid 512, and Applicants' new spatial domain pyramid 514. In FIG. 5A, the time in milliseconds to build and collapse a 960×540 image in MATLAB is shown underneath the frequency response of each pyramid. In FIG. 5A, each of the transfer functions 510, 512, 514 is represented with a corresponding y-axis frequency, $\omega_y$ (element 482) and a corresponding x-axis frequency, $\omega_x$ (element 484).

FIG. 5B illustrates a one dimensional cross section of the impulse responses 520 and filter windows 522 corresponding to FIG. 5A, for each of the methods including Laplacian 550, Frequency-based 552, and some embodiments that include a Riesz pyramid 554.

FIG. 5C illustrates a synthetic Gaussian, shifted with the techniques of FIG. 5B (550, 552, 554), Ground Truth (558), and the input (556), for two corresponding amplification factors: 20× (element 530) and 50× (element 532), respectively. Each of the graphs 530, 532 of FIG. 5C illustrate a y-axis of intensity 526 vents an x-axis of space 524.

Approximate Riesz Transform

In some embodiments, after initially decomposing the image into separate sub-bands, the Riesz pyramid may compute an approximate Riesz transform of each band. Some embodiments may exploit the fact that each image scale may be a critically sampled spatially bandpassed signal. Therefore, most of the sub-band's energy may be concentrated in a frequency band around $$\|\vec{\omega}\| = \frac{\pi}{2}$$

Figure 3D:
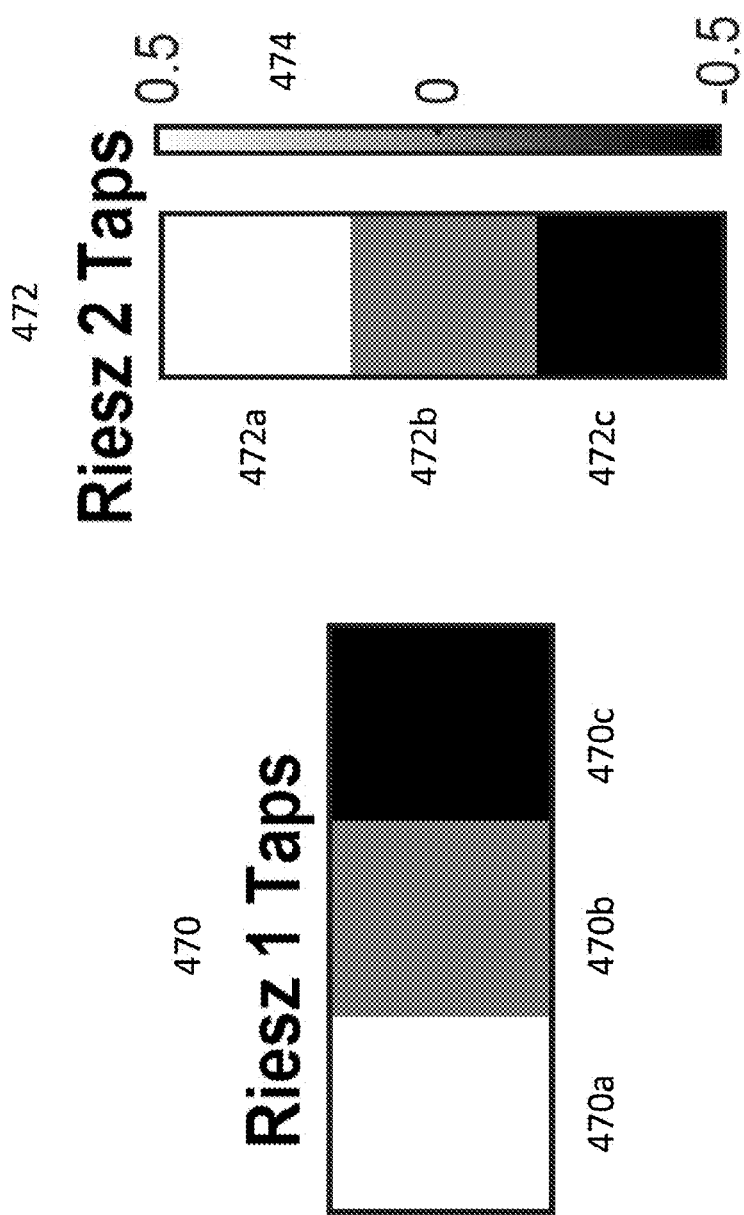
FIG. 3D illustrates Riesz transform filter taps.

(the Nyquist frequency may be at $\omega_x = \omega_y = \pi$). As a result, some embodiments may approximate the Riesz transform with the three-tap finite difference filters [0.5, 0, −0.5] and [0.5, 0, −0.5]$^T$, which may also approximate real and imaginary parts of the Riesz transform. According to some embodiments, FIG. 3D illustrates the Riesz 1 tap filter 470 including its respective values [0.5, 0, −0.5] (elements 470a, 470b, and 470c, respectively). According to some embodiments, FIG. 3D also illustrates the Riesz 2 tap filter 470 including its respective values [0.5, 0, −0.5]$^T$ (elements 472a, 472b, and 472c, respectively), along with a corresponding shading chart 474 indicating values from −0.5 to 0.5.

The approximation may be made at least because these filters have the frequency response (including, but not limited to, a frequency response for a discrete-time Fourier transform, or DTFT):

$$-i\sin(\omega_x) \approx -i\frac{\omega_x}{\|\omega_x\|}, -i\sin(\omega_y) \approx -i\frac{\omega_y}{\|\omega_y\|}, \quad (7)$$

When $107_x$, $$\omega_y \approx \frac{\pi}{2}.$$

Figure 4B:
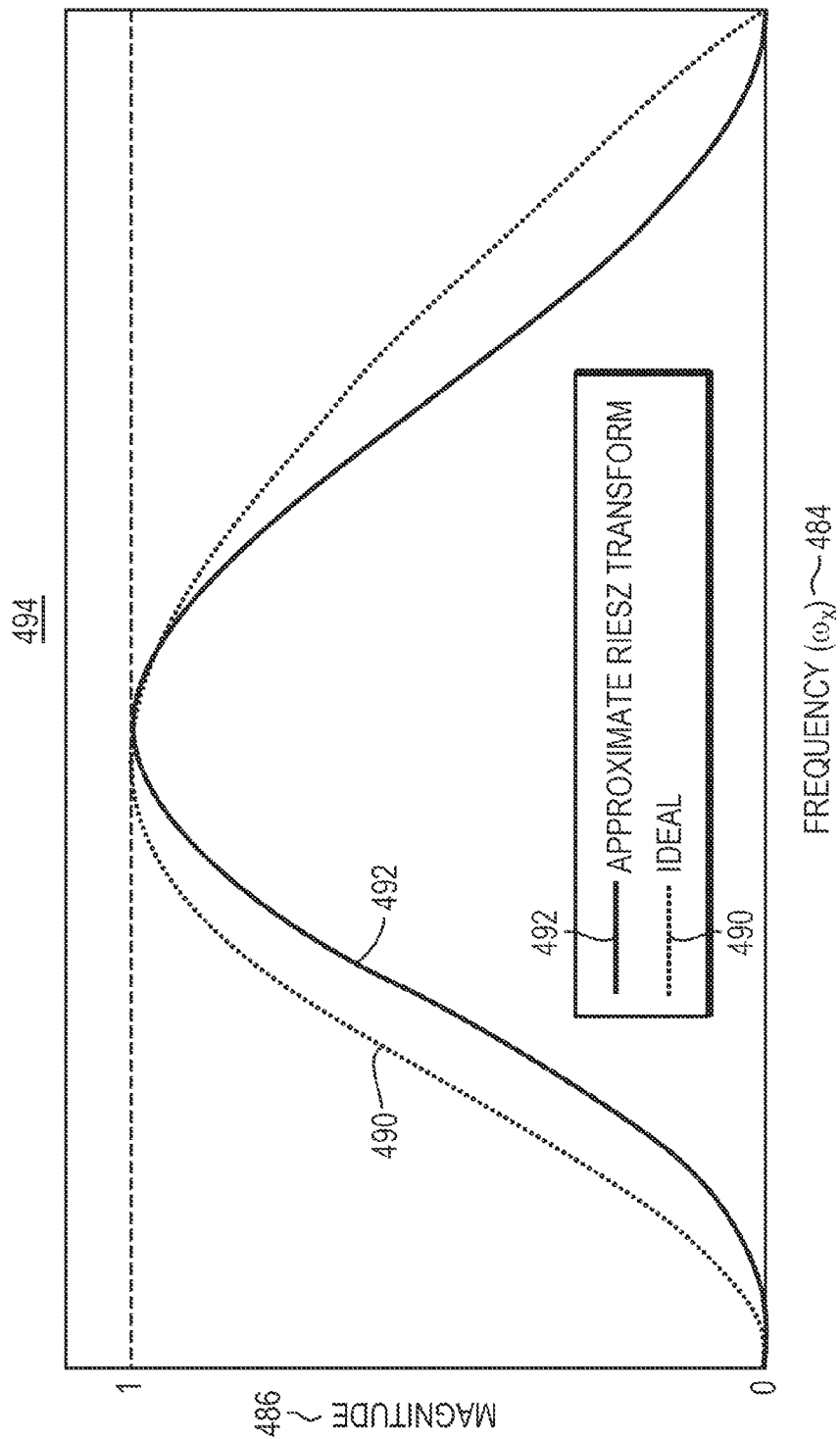

This frequency response is similar to the frequency response of the Riesz transform as illustrated in FIGS. 4A-4B. That is, these filters may change the phase of the band by 90 degrees in the x and y directions respectively, while not changing the amplitude substantially, (for non-limiting example, similarly to Equation 2). For images, rather than image sub-bands, these three tap filters may provide an improved approximation to the derivative. This is because images may have most of their spectral content concentrated at low frequencies. When $\omega \approx 0$, preferably $-i \sin (\omega) \approx -i\omega$ which may be the frequency response of the derivative operator.

In the supplementary material, hereby incorporated by reference in its entirety herein (Wadhwa, N., Rubinstein, M., Durand, F., and Freeman, W. T., "Supplemental for Riesz Pyramids for Fast Phase-Based Video Magnification," retrieved from the Internet at people.csail.mit.edu under the directory "nwadhwa," followed by the sub-directory "riesz-pyramid," as the file "RieszPyrSupplemental.zip," 5 pages, May 2014) some embodiments may provide a method to generate higher-tap approximations to the Riesz transform using a technique similar to the technique of Simoncelli (see for example, the following publication that is hereby incorporated by reference in its entirety herein: Simoncelli, E. P., "Design of Multi-Dimensional Derivative Filters," *IEEE International Conference on Image Processing*, volume 1, November 1994, 790-794) to find derivative filter taps (see for example, hereby incorporated by reference in its entirety herein: Simoncelli, E. P., "Design of Multi-Dimensional Derivative Filters," *IEEE International Conference on Image Processing*, volume 1, November 1994, 790-794). In practice, in some embodiments, using two three-tap filters to approximate the Riesz transform provides motion magnification results that are comparable to using higher-tap approximations or the frequency domain implementation of the Riesz transform.

Although one skilled in the art may construct one or more linear filters that preferably includes two three-tap finite difference filters, which may include tap values of [0.5, 0, −0.5] and [0.5, 0, −0.5]$^T$, respectively. Details on the design and implementation techniques of some embodiments are also available in the following publication, which is hereby incorporated by reference in its entirety herein and also incorporated in its substance herein: Wadhwa, N., Rubinstein, M., Durand, F., and Freeman, W. T., "Supplemental for Riesz Pyramids for Fast Phase-Based Video Magnification," retrieved from the Internet at people.csail.mit.edu under the directory "nwadhwa," followed by the sub-directory "riesz-pyramid," as the file "RieszPyrSupplemental.zip," May 2014.

Approximating the Riesz Transform

Some embodiments may replace a more expensive Fourier domain implementation of the Riesz transform with an approximate Riesz transform that is implemented with simple primal domain filters. Following is a discussion of the cost of this approximation and how spatial smoothing of the phase signal alleviates this cost.

The Riesz transform may be computed in the Fourier domain by using the transfer function $$-i\frac{(\omega_x, \omega_y)}{\sqrt{\omega_x^2 + \omega_y^2}} \tag{S7}$$

In some embodiments, the finite difference filter $[-0.5, 0, 0.5]$ and $[-0.5, 0, 0.5]^T$ are good approximations to the Riesz transform when the input is a subband. Some embodiments further motivate this approximation and provide a method to design spatial domain filters that approximate the Riesz transform of image subbands.

Some embodiments may include an optimization procedure, inspired by Simoncelli (see for example, hereby incorporated by reference in its entirety herein: Simoncelli, E. P., "Design of Multi-Dimensional Derivative Filters," *IEEE International Conference on Image Processing*, volume 1, November 1994, 790-794), to find the taps of spatial domain filters for the Riesz pyramid. The method may work by finding taps that minimize the weighted mean squared error between the Discrete Time Fourier Transform (DTFT) of the filter and the Riesz transform transfer function $$\frac{\omega_y}{\sqrt{\omega_x^2 + \omega_y^2}}.$$

The weights $W(\omega_x, \omega_y)$ may be chosen to be the transfer function of a subband filter times the expected inverse square spectrum of images. In some embodiments, the Riesz transform filters may be 90 degrees symmetric, so preferably one filter is designed. In addition, each filter may anti-symmetric in one direction and symmetric in the other. This may greatly reduce the number of filter taps specified. The filter may be designed that is anti-symmetric in y. The objective function then may be:

$$\int\int W(\omega_x, \omega_y)^2 \left(D_a(\omega_x, \omega_y) - \frac{\omega_y}{\sqrt{\omega_x^2 + \omega_y^2}}\right)^2 d\omega_x dw_y \tag{S8}$$

where $D_a$ may be the DTFT of the 2n+1×2m+1 filter a, given by $$\sum_{i=1}^{n}\sum_{j=0}^{m} 2a_{ij}\cos(j\omega_x)\sin(i\omega_y) \tag{S9}$$

The symmetries of a imply that $a_{ij}=-a_{-ij}$ and $a_{i,j}=a_{i,-j}$.

In some embodiments, this may be a weighted linear least squares problem and may be solved using standard techniques. Some embodiments include solutions for 3×1, 5×1 and 3×3 filters, as shown in Table 2. In some embodiments, the filter taps for the pyramid filters specified one dimension in Table 1(a), in terms of the McClellan transformation in Table 1(b-c) and direct form in Table 1(d-e). Some embodiments may round the 3×1 filter to $[-0.5, 0, 0.5]^T$. Also, note that filters of this form may be used to approximate gradients and/or derivatives. This makes sense for images, which have most of their spectral content at low frequencies. According to some embodiments, image subbands may have much of their spectral content at mid-range frequencies, which is why these filters may be better approximations of the Riesz transform.

Motion Processing with the Riesz Transform

According to some embodiments, in order to see how motion may be manipulated with the Riesz transform, consider a model (including, but not limited to, a toy model, real model, and/or simulation model) of a single image scale: a two dimensional oriented sinusoid that is undergoing a small horizontal motion $\delta(t)$, $$I(x, y, t) = A\cos(\omega_x(x-\delta(t))+\omega_y y) \tag{8}$$

From Equation 2, the Riesz transform of this sinusoid may be the pair:

$$A\frac{(\omega_x, \omega_y)}{\sqrt{\omega_x^2 + \omega_y^2}}\sin(\omega_x x + \omega_y y - \omega_x\delta(t)) \tag{9}$$

From Equation 5, the quadrature pair Q may be:

$$Q(x, y, t) = A\sin(\omega_x x + \omega_y y - \omega_x\delta(t)), \tag{10}$$

which may agree with the one-dimensional case. From Equation 6, the local phase $\phi$ and amplitude A may be:

$$A \text{ and } \phi = \omega_x x + \omega_y y - \omega_x\delta(t) \tag{11}$$

The local phase $\phi$ may be temporally filtered to remove the direct current (DC) component $\omega_x x + \omega_y y$ and then amplified to yield $\alpha\omega_x\delta(t)$. The input signal may be phase shifted by this amount along the dominant orientation:

$$\text{Real}(e^{-i\alpha\omega_x\delta(t)}(I+iQ)) \tag{12}$$

to produce a motion-magnified sinusoid:

$$A\cos(\omega_x(x-(1+\alpha)\delta(t))+\omega_y y) \tag{13}$$

Temporal Filtering and Phase Denoising

In recent Eulerian motion magnification, motions of interest may be isolated and denoised through the use of temporal filtering (see for example, the following publications that are hereby incorporated by reference in their entirety herein: Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, 80:1-80:9; and Wu, H.-Y., Rubinstein, M., Shih, E., Guttag, J., Durand, F., and Freeman, W. T., "Eulerian Video Magnification for Revealing Subtle Changes in the World," *ACM Trans. Graph. (Proc. SIGGRAPH)* 31, 4, Jul. 2012, 65:1-65:8).

In some embodiments of the image representation, the local phase may be defined up to a sign depending on whether the orientation (referring to FIG. 3A, element 208) is specified by an angle $\theta$ or its antipode $\theta+\pi$. Therefore, some embodiments may take into account the orientation (208 of FIG. 3A) when filtering, by using the quaternion formulation of Equation 3 that is introduced by Felsberg and Sommer (see for example, hereby incorporated by reference in its entirety herein: Felsberg, M. and Sommer, G., "The Monogenic Signal," *IEEE Transactions on Signal Processing*, 49, 12, December 2001, 3136-3144). In some embodiments that may include this formulation, the phase signal may be represented by $$\cos(\phi) + i\sin(\phi)\cos(\theta) + j\sin(\phi)\sin(\theta) \quad (13b)$$

where $\phi$ may be the local phase and $\theta$ may be the local orientation and $i^2=j^2=k^2=ijk=-1$ may be quaternionic imaginary units.

In addition to temporal filtering, Wadhwa improves their results (e.g., further increased the signal-to-noise ratio, or SNR, of the phase signal) by spatially denoising the phase signal with an amplitude-weighted spatial blur applied to each sub-band (see the following publication, which is hereby incorporated by reference in its entirety herein: Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, 80:1-80:9). Embodiments are capable of performing these functions (e.g., isolation, denoising, and spatial blur) with the Riesz pyramid.

Figure 6:
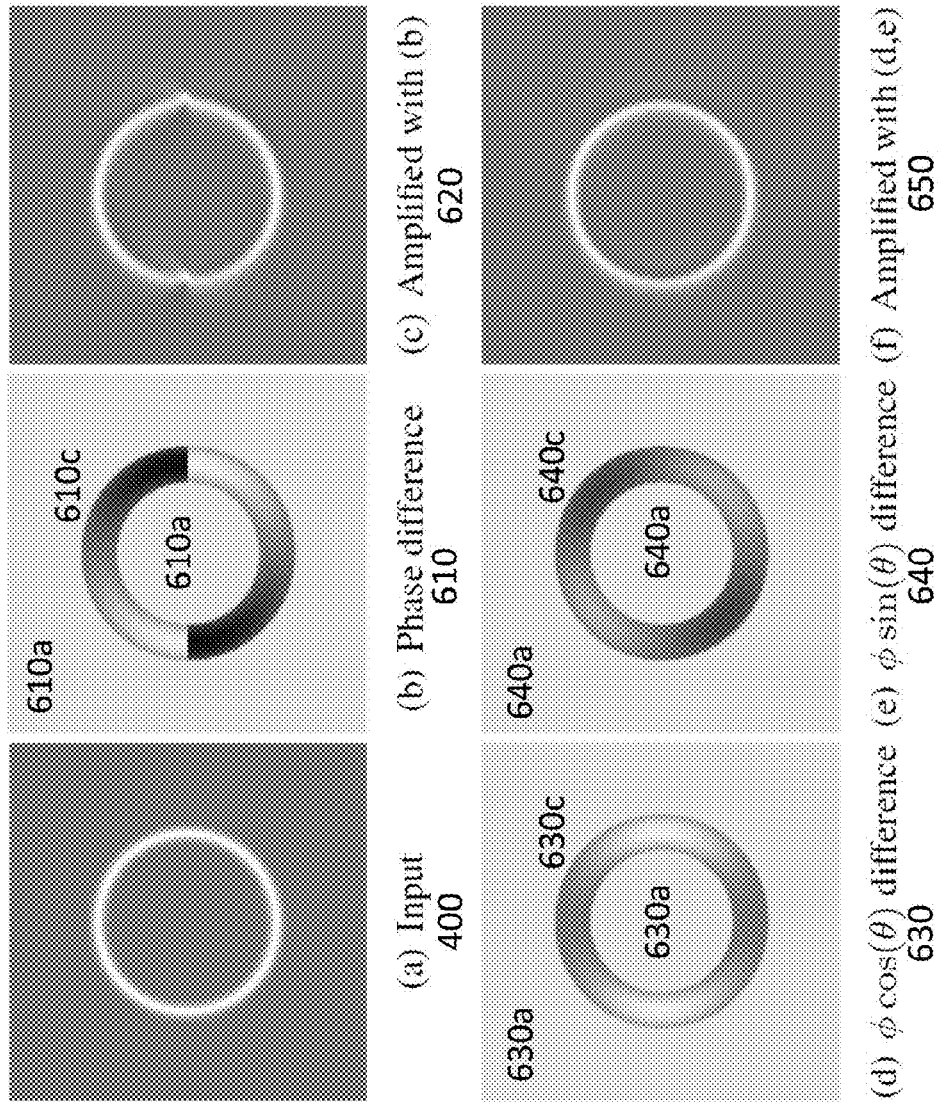
FIG. 6 illustrates motion magnification steps according to some embodiments.

However, referring to an embodiment of FIG. 6, the local phase $\phi$ preferably is not naively filtered (see FIG. 6, elements 610, 620, representing an embodiment) because the local phase may be defined up to a sign depending on whether the orientation is specified by an orientation (referring to FIG. 3A, element 208), e.g., angle $\theta$ or its antipode $\theta+\pi$. Therefore, in some embodiments, instead of filtering the phase $\phi$, the orientation may be taken into account when filtering and the following quantities are filtered:

$$\phi\cos(\theta), \phi\sin(\theta) \quad (14)$$

which may be invariant (e.g. linear time invariant, or LTI) to the difference between $(\phi, \theta)$, and $(-\phi, \theta+\pi)$.

After temporal filtering, an amplitude weighted blur may be performed on the quantities in Eq. 14 and recombined to obtain $$\cos(\theta)\frac{A\phi\cos(\theta) * K_\rho}{A * K_\rho} + \sin(\theta)\frac{A\phi\sin(\theta) * K_\rho}{A * K_\rho} \quad (15)$$

where $K_\rho$ is a Gaussian blur kernel with standard deviation $\rho$. Then, phase shift is preferably performed as in Equation 12.

FIG. 6 illustrates the difference between spatio-temporal filtering of $\phi$ directly and filtering Equation 14 for a given input image 400. The phase difference (FIG. 6, element 610) switches sign on the left and right side of the circle when the orientation wraps around from 0 to $\pi$. When the phase is subsequently spatially denoised, the phase signal at these locations may be close to 0 causing them to not get magnified (FIG. 6, element 620). In contrast, filtering $\phi\cos(\theta)$ and $\phi\sin(\theta)$ alleviates this problem as the phase difference does not change signs abruptly (see FIG. 6, elements 630, 640, and 650).

Note that FIG. 6 includes multiple embodiments. One or more of the elements of FIG. 6 (elements 610, 620, 630, 640, and 650) may be used in a given embodiment. For non-limiting example, although the embodiment of FIG. 6 that includes elements 610 and 620 is advantageous, the preferred embodiment in FIG. 6 is the embodiment that includes elements 630, 640, and 650.

According to some embodiments, Equations 14 and 15 follow directly from the quaternion formulation of the Riesz pyramid. That formulation, justification for these equations and an existing technique to do linear time invariant (LTI) filtering on quaternions (the following publication is hereby incorporated by reference in its entirety herein: Lee, J. and Shin, S. Y., "General Construction of Time-Domain Filters for Orientation Data," *IEEE Transactions on Visualization and Computer Graphics*, 8, 2, Apr.-Jun. 2002, 119-128) are available in a technical report (the following publication is hereby incorporated by reference in its entirety: Wadhwa, N., Rubinstein, M., Durand, F., and Freeman, W. T., "Quaternionic Representation of the Riesz Pyramid for Video Magnification," Technical Report, MIT Computer Science and Artificial Intelligence Laboratory, retrieved from the Internet at people.csail.mit.edu under the directory "nwadhwa," followed by the sub-directory "riesz-pyramid," as the file "quaternionMM.pdf," April 2014).

FIG. 6 illustrates that the motion between the input 400 and a copy shifted to the left (or right in some embodiments) by one half pixel (not shown in FIG. 6) are magnified in at least two ways. First, the phase difference of $\phi$ (element 610) is spatially denoised and then used to magnify the second frame (element 620). In the bottom row of FIG. 6, the difference in the quantities $\phi\cos(\theta)$ (element 630) and $\phi\sin(\theta)$ (element 640) are spatially denoised and then used to amplify the second frame (element 650). According to some embodiments, the difference in $\phi\cos(\theta)$ (element 630) may include the difference between $\phi\cos(\theta)$ for the input image 400 and $\phi\cos(\theta)$ for the copy of image 400 that is shifted to the left. Similarly, the difference in $\phi\sin(\theta)$ (element 640) may include the difference between $\phi\sin(\theta)$ for the input image 400 and $\phi\sin(\theta)$ for the copy of image 400 that is shifted to the left. In 610, 630, 640, low amplitude regions (610a, 630a, and 640a, respectively) are highlighted inside and outside of the respective circles (610c, 630c, and 640c, respectively), middle gray corresponds to a difference of zero, and a single sub-band is shown.

Quaternionic Representation

Some embodiments may include a Quaternionic representation of Riesz pyramids. Implementations of the Riesz Pyramids that use Quaternionic representation are found in the following publication by Applicants, which is hereby incorporated by reference in its entirety: Wadhwa, N., Rubinstein, M., Durand, F., and Freeman, W. T., "Quaternionic Representation of the Riesz Pyramid for Video Magnification," Technical Report, MIT Computer Science and Artificial Intelligence Laboratory, retrieved from the Internet at people.csail.mit.edu under the directory "nwadhwa," followed by the sub-directory "riesz-pyramid," as the file "quaternionMM.pdf," Apil 2014.

In some embodiments, magnification may be performed in a similar way as Wadhwa (hereby incorporated by reference in its entirety herein: Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, 80:1-80:9). However, rather than computing the local phase, some embodiments instead compute the quaternionic phase of the Riesz pyramid coefficients and filter them first in time and then in space. This may resolve the sign issue and is completely analogous to Wadhwa, except instead of filtering the complex logarithm of the normalized coefficients in a complex steerable pyramid, filtering the quaternionic logarithm of the normalized coefficients in a Riesz pyramid may be performed.

Quaternionic Background

In some embodiments, the Riesz pyramid, may use the Riesz transform to manipulate the phase in non-oriented sub-bands of an image sequence to produce real-time motion-magnified videos. To follow is a quaternionic formulation of the Riesz pyramid.

Numerous phenomena exhibit small motions that may be invisible to the naked eye. These motions require computational amplification to be revealed (see for example, hereby incorporated by reference in its entirety herein: Liu, C., Torralba, A., Freeman, W. T., Durand, F., and Adelson, E. H., "Motion Magnification," *ACM Trans. Graph.*, 24, 3, Jul. 2005, 519-526; Rubinstein, M., "Analysis and Visualization of Temporal Variations in Video," PhD Thesis, Massachusetts Institute of Technology, February 2014, 118 pages; Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, 80:1-80:9; and Wu, H.-Y., Rubinstein, M., Shih, E., Guttag, J., Durand, F., and Freeman, W. T., "Eulerian Video Magnification for Revealing Subtle Changes in the World," *ACM Trans. Graph. (Proc. SIGGRAPH)* 31, 4, Jul. 2012, 65:1-65:8). Manipulating the local phase in coefficients of a complex steerable pyramid decomposition of an image sequence may be an effective way to amplify small motions. However, complex steerable pyramids may be very overcomplete (21 times) and costly to construct, making them potentially unsuitable for real-time processing.

Some embodiments include a new image pyramid representation, the Riesz pyramid, that is suitable for real-time Eulerian phase-based video processing (see for example, hereby incorporated by reference in its entirety herein: Wadhwa, N., Rubinstein, M., Durand, F., and Freeman, W. T., "Riesz Pyramids for Fast Phase-Based Video Magnification," *Computational Photography (ICCP)*, 2014 *IEEE International Conference on. IEEE*, May 2014). This representation may include first decomposing an image into non-oriented sub-bands and then applying an approximate Riesz transform, which may be a two dimensional generalization of the Hilbert transform, to each sub-band. The Riesz transform may be a two channel filter bank, so the coefficients of the Riesz pyramid may be triples including the sub-band value and two Riesz transform values (see for example, hereby incorporated by reference in its entirety herein: Felsberg, M. and Sommer, G., "The Monogenic Signal," *IEEE Transactions on Signal Processing*, 49, 12, Dec. 2001, 3136-3144; and Unser, M., Sage, D., and Van De Ville, D., Multiresolution Monogenic Signal Analysis Using the Riesz-Laplace Wavelet Transform," *IEEE Transactions on Image Processing*, 18, 11, Nov. 2009, 2402-2418). The Riesz pyramid may be used for phase-based motion magnification at least because the Riesz transform may be a steerable Hilbert transformer that enables computation of a quadrature pair that is 90 degrees out of phase with the original sub-band with respect to the dominant orientation at every image pixel. Some embodiments may phase-shift and translate image features in the direction of the dominant orientation, rather than in a sampling of orientations as done in the complex steerable pyramid. As such, some embodiments provide an advantage in that they vastly reduce the overcompleteness of the representation and make the computation more efficient.

In some embodiments, the local phase at a point may be positive or negative depending on whether the orientation is expressed by an angle θ or its antipode θ+π. The corresponding difference between orientations may not be present in the complex steerable pyramid as the orientation of each sub-band may be fixed. This may cause deficiencies when performing spatiotemporal filtering on the phases, especially in regions where the orientation angle wraps around regardless of what specific angle is specified as the wraparound point (see FIG. 6, element 620).

Some embodiments resolve these above-mentioned deficiencies by turning to the quaternionic formulation of the Riesz pyramid triples (see for example, hereby incorporated by reference in its entirety herein: Felsberg, M. and Sommer, G., "The Monogenic Signal," *IEEE Transactions on Signal Processing*, 49, 12, Dec. 2001, 3136-3144). Instead of using the local phase as specified before, some embodiments spatiotemporally filter the quaternionic phase, which may be invariant to the aforementioned difference. This quaternionic phase may be related to a quaternion by the quaternion logarithm in the same way the phase of a complex number may be related to it by the complex logarithm.

The description to follow includes technical details and definitions of how to use quaternions to perform phase analysis and video magnification. Further details about the Riesz pyramid and motion magnification may result in natural and synthetic sequences (see for example, hereby incorporated by reference in its entirety herein: Wadhwa, N., Rubinstein, M., Durand, F., and Freeman, W. T., "Riesz Pyramids for Fast Phase-Based Video Magnification," *Computational Photography (ICCP)*, 2014 *IEEE International Conference on. IEEE*, May 2014).

A Riesz pyramid coefficient may include an input subband I and two Riesz transform values $(R_1, R_2)$. This triple may be used to determine the local amplitude A, local phase φ and local orientation θ (see for example, hereby incorporated by reference in its entirety herein: Unser, M., Sage, D., and Van De Ville, D., Multiresolution Monogenic Signal Analysis Using the Riesz-Laplace Wavelet Transform," *IEEE Transactions on Image Processing*, 18, 11, Nov. 2009, 2402-2418). In Equation 3, duplicated here for readability as Equation Q1, the Riesz pyramid coefficient may be related with these three quantities A, φ, and/or θ:

$$I=A\cos(\phi), R_1=A\sin(\phi)\cos(\theta), R_2=A\sin(\phi)\sin(\theta) \quad (Q1)$$

That is, the local phase φ and orientation θ may be angles in a spherical representation of the value $(I, R_1, R_2)$. According to some embodiments, there may not be a unique solution for these angles. If $(A, \phi, \theta)$ is a solution to Equation Q1, then, optimally, so is $(A, -\phi, \theta+\pi)$. In some embodiments, a solution to this problem is to instead consider $$\phi\cos(\theta), \phi\sin(\theta) \quad (Q2)$$

which may be invariant to this sign difference. If the Riesz pyramid coefficient is viewed as a quaternion, then Equation Q2 may be the quaternion logarithm of the normalized coefficient. In some embodiments, this may be analogous to the complex steerable pyramid, in which the phase may be the complex logarithm of a complex coefficient. This justifies the use of Equation Q2 as a proxy for the motion. To follow is review of complex exponentiation and logarithms and quaternions.

Complex Exponential and Logarithm The exponential function of a complex number z=a+ib can be defined through the power series $$e^z = \sum_{n=0}^{\infty} \frac{z^n}{n!} = e^a(\cos(b) + i\sin(b)). \quad (Q3)$$

The inverse (logarithm) of the map is not well-defined as multiple complex inputs map to the same output. For example, $e^{i2\pi}=e^{i4\pi}=1$, which means that log(1) could equal i2π or i4π in addition to its usual value of 0. This problem may be solved by restricting the imaginary part of the logarithm to lie in the range [-π, π]. That is, the imaginary part may take its principal value. Then the logarithm of a complex number $z=a+ib$ may be $$\log(z)=\log(\sqrt{a^2+b^2})+i\,a\tan 2(b,a) \tag{Q4}$$

In the case of a unit complex number, the first term may be zero, leaving:

$$\log(z)=i\,a\tan 2(b,a) \tag{Q5}$$

which may be the principal value of the phase of the complex number. Therefore, complex logarithm and exponentiation may provide a useful way to go from a complex number to its phase and back again.

Quaternions

Quaternions may be a generalization of the complex numbers, in which there may be three imaginary units, denoted i, j and k, so that each quaternion may be characterized by four numbers, one real and three imaginary. Quaternion multiplication may be associative and distributive with addition and may therefore be defined by the following property of the imaginary units:

$$-1=i^2=j^2=k^2=ijk. \tag{Q6}$$

Specifically, multiplication may be given by $$(q_1+iq_2+jq_3+kq_4)(r_1+ir_2+jr_3+kr_4)=(q_1r_1-q_2r_2-q_3r_3-q_4r_4)+i(q_1r_2+q_2r_1-q_3r_4-q_4r_3)+j(q_1r_3-q_2r_4+q_3r_1+q_4r_2)+k(q_1r_4+q_2r_3-q_3r_2+q_4r_1). \tag{Q7}$$

Note that multiplication is noncommutative.

For a quaternion $q=q_1+iq_2+jq_3+kq_4$ its conjugate $q^*$, norm $\|q\|$ and inverse $q^{-1}$ may be defined as $$q^*=q_1-iq_2-jq_3-kq_4, \tag{Q8}$$

$$\|q\|=\sqrt{q_1^2+q_2^2+q_3^2+q_4^2}, \tag{Q9}$$

$$q^{-1}=q^*/\|q\|^2, \tag{Q10}$$

where the third definition follows from the first two. The exponential of a quaternion $q=q_1+v$ (where $v=iq_2+jq_3+kq_4$) may be defined by its power series as with the complex number (Equation Q3), $$e^q = \sum_{n=0}^{\infty} \frac{q^n}{n!} = e^{q_1}\left(\cos(\|v\|) + \frac{v}{\|v\|}\sin(\|v\|)\right) \tag{Q11}$$

The inverse of this function is $$\log(q) = \log(\|q\|) + \frac{v}{\|v\|}\mathrm{acos}\left(\frac{q_1}{\|q\|}\right) \tag{Q12}$$

In the case of a unit quaternion, where $\|q\|=1$, this may simplifies to $$\frac{v}{\|v\|}\mathrm{acos}(q_1). \tag{Q13}$$

The result of Equation Q13 may be an imaginary quantity that may be analogous to Equation Q5 and may be referred to as the quaternionic phase, to distinguish it from the local phase in the non-quaternionic formulation of the Riesz pyramid in Wadhwa, N., Rubinstein, M., Durand, F., and Freeman, W. T., "Riesz Pyramids for Fast Phase-Based Video Magnification," *Computational Photography(ICCP)*, 2014 *IEEE International Conference on. IEEE*, May 2014, which is hereby incorporated by reference in its entirety herein.

Quaternion Representation of Riesz Pyramid

Now that quaternions are defined, the Riesz pyramid may be represented by coefficient triple $(I, R_1, R_2)$ as a quaternion r with the original subband I being the real part and the two Riesz transform components $(R_1, R_2)$ being the imaginary i and j components of the quaternion as $$r=I+iR_1+jR_2 \tag{Q14}$$

Or, according to some embodiments, using Equation Q1 the triple may be written as $$r=A\cos(\phi)+iA\sin(\phi)\cos(\theta)+jA\sin(\phi)\sin(\theta). \tag{Q15}$$

Rather then solving for the local amplitude A, phase $\phi$ and orientation $\theta$, the quaternionic phase defined earlier may be used instead. That is, the amplitude and quaternionic phase (elements 218, 212a, and 212b of FIG. 3B) may be expressed as $$A=\|r\|$$

$$i\phi\cos(\theta)+j\phi\sin(\theta)=\log(r/\|r\|) \tag{Q16}$$

The second quantity may be computed by applying Equation Q13 to the case of normalized Riesz pyramid coefficients and may be invariant to whether the local phase and orientation are $\phi$ and $\theta$ or the antipode $-\phi$ and $\theta+\pi$.

Video Magnification with Quaternions

In some embodiments, as illustrated in FIG. 3B, video magnification may be performed in a similar way as in Wadhwa (hereby incorporated by reference in its entirety herein: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9). However, rather than computing the local phase, which may have a different sign, the quaternionic phase of the Riesz pyramid coefficients may be computed and filtered first in time and then in space. As such, some embodiments may resolve the sign issue. Some embodiments may be analogous to Wadhwa (hereby incorporated by reference in its entirety herein: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, Jul. 2013, 80:1-80:9), except instead of filtering the complex logarithm of the normalized coefficients in a complex steerable pyramid, the quaternionic logarithm of the normalized coefficients in a Riesz pyramid may be filtered.

Filtering of Quaternionic Phase

While the quaternionic phase may resolve the sign difference in filtering $\phi$ (x, y, t) directly, it still may be a wrapped quantity. That is, $i\phi\cos(\theta)+j\phi\sin(\theta)$ and $i(\phi+2\pi)\cos(\theta)+j(\phi+2\pi)\sin(\theta)$ may correspond to the same value. Therefore, instead of filtering the quaternionic phase directly, a technique by Lee and Shin may be used (see for example, which is hereby incorporated by reference in its entirety herein, Lee, J. and Shin, S. Y., "General Construction of Time-Domain Filters for Orientation Data," *IEEE Transactions on Visualization and Computer Graphics*, 8, 2, Apr.-Jun. 2002, 119-128) to filter a sequence of unit quaternions. This technique may be tantamount to phase unwrapping the quaternionic phases in time and then performing Linear Time Invariant (LTI) filtering. As such, some embodiments may use it to LTI filter the Riesz pyramid coefficients at each pixel in each scale in time and then in a subsequent step spatially smooth the pixel values with an amplitude weighted blur to improve Signal-to-Noise Ratio (SNR). Some embodiments include the assumption that the local orientation at any pixel may be roughly constant in time and approximately locally constant in space.

According to some embodiments, at a single location (x, y) in a single scale $\omega_r$, the normalized Riesz pyramid coefficients may be $$r_1, r_2, \ldots, r_n \qquad (Q17)$$

where $r_m = \cos(\phi_m) + i\sin(\phi_m)\cos(\theta_m) + j\sin(\phi_m)\sin(\theta_m)$, the most general form of a unit quaternion with no k component.

According to some embodiments, ordinary complex phase unwrapping may be used, which may take the principal value of the difference between successive terms and then perform a cumulative sum to provide an unwrapped sequence in which the difference between two successive terms may be in the interval $(-\pi, \pi]$. Some embodiments compute the principle value of the phase difference between successive coefficients by dividing them and then taking the logarithm.

$$\log(r_1), \log(r_2 r_1^{-1}), \ldots, \log(r_n r_{n-1}^{-1}) \qquad (Q18)$$

The terms $(r_m r_{m-1}^{-1})$ may in general have a nonzero k component (Equation Q7). However, in some embodiments, under the assumption that $\theta m = \theta + \epsilon$, that is that the local orientation is roughly constant over time at every pixel, the k term may be close to zero. More explicitly, $$r_m r_{m-1}^{-1} = \cos(\phi_m - \phi_{m-1}) + \qquad (Q19)$$
$$i\sin(\phi_m - \phi_{m-1})\cos(\theta) + j\sin(\phi_m - \phi_{m-1})\sin(\theta) + O(\epsilon)$$

which, ignoring the $o(\epsilon)$ term, has logarithm $$i([\phi_m - \phi_{m-1}])\cos(\theta) + j([\phi_m - \phi_{m-1}])\sin(\theta) \qquad (Q20)$$

where the bracketed terms are taken modulo $2\pi$.

The second step may be to perform a cumulative sum of Equation Q18

$$\phi_1 u, (\phi_1 + [\phi_2 - \phi_1])u, \ldots, \left(\phi_1 + \sum_{l=2}^{n} [\phi_l - \phi_{l-1}]\right) u \qquad (Q21)$$

where $u = i\cos(\theta) + j\sin(\theta)$. If $\phi'_m = \phi_1 + \Sigma_{l=2}^{m}[\phi_l - \phi_{l-1}]$ this series may be written as $$i\phi'_m \cos(\theta) + j\phi'_m \sin(\theta) \qquad (Q22)$$

At every pixel, some embodiments may perform temporal filtering on this quantity to isolate motions of interest.

Spatial Smoothing

Some embodiments may perform a spatial amplitude weighted blur with Gaussian kernel $K_\rho$ with standard deviation $\rho$ on the i and j components of the temporally filtered signal to further increase SNR $$i\frac{A\phi'\cos(\theta) * K_\rho}{A * K_\rho} + j\frac{A\phi'\sin(\theta) * K_\rho}{A * K_\rho} \qquad (Q23)$$

where A may be the amplitude of the Riesz pyramid coefficients. Some embodiments assume that the orientation may not change substantially in the support of $K_\rho$, and, therefore, may move $\cos(\theta)$ and $\sin(\theta)$ outside of the convolution in Equation Q23 to obtain $$i\cos(\theta)\phi'' + j\sin(\theta)\phi'' \qquad (Q24)$$

where $$\phi'' = \frac{A\phi' * K_\rho}{A * K_\rho}.$$

Amplification

Some embodiments may motion amplify a Riesz pyramid coefficient in the same way as a phase-shift of a complex number. First, some embodiments perform a quaternion exponentiation on the filtered and amplified (by $\alpha$) quaternionic phase (Equation Q24) to produce a unit quaternion $$\cos(\alpha\phi'') + i\sin(\alpha\phi'')\cos(\theta) + j\sin(\alpha\phi'')\sin(\theta) \qquad (Q25)$$

This unit quaternion may then be multiplied by the original coefficient $I + iR_1 + jR_2$ in the Riesz pyramid. According to some embodiments, the real part of the result, by Equation Q7 may be equal to $$I\cos(\alpha\phi'') - R_1 \sin(\alpha\phi'')\cos(\theta) - R_2 \sin(\alpha\phi'')\sin(\theta) \qquad (Q26)$$

This may give the coefficients of a real Laplacian-like pyramid for every frame, in which the motions may be magnified, which may then be collapsed to produce a motion magnified video (referring to element 230 of FIG. 3B).

Some embodiments provide an alternate formulation of the magnification in terms of phase shifting the input subband when it is regarded as the real part of a complex number, whose imaginary part is a quadrature pair that is 90 degrees phase shifted along the dominant orientation $\theta$.

As such, some embodiments may take Equation Q23 and combine the two components by multiplying by $\cos(\theta)$ and $\sin(\theta)$ and then summing to get $$\cos(\theta)\frac{A\phi'\cos(\theta) * K_\rho}{A * K_\rho} + \sin(\theta)\frac{A\phi'\sin(\theta) * K_\rho}{A * K_\rho} = \phi'' \qquad (Q27)$$

which may be Equation 15. This quantity may then be amplified by $\alpha$ and then complex exponentiation may be used to obtain $$\cos(\alpha\phi'') + i\sin(\alpha\phi'') \qquad (Q28)$$

This result then may be multiplied by I+iQ, where $Q = R_1 \cos(\theta) + R_2 \sin(\theta)$ may be a Hilbert transform of I along the dominant orientation $\theta$. The multiplication yields $$I\cos(\alpha\phi'') - R_1 \sin(\alpha\phi'')\cos(\theta) - R_2 \sin(\alpha\phi'')\sin(\theta) \qquad (Q29)$$

which may be identical to Equation Q26, showing that the quaternion formulation may yield the same results as the non-quaternion embodiments mentioned earlier in this disclosure.

Above, a quaternionic formulation of the Riesz pyramid is presented. In this formulation, the quaternionic phase may be used as a proxy for the motion signal. Because this representation may be invariant to sign difference in the local phase of the signal, some embodiments may spatially and temporally filter it to isolate motions of interest. This may then be amplified and used to phase shift the original Riesz pyramid coefficients to produce a motion magnified signal.

Results

The phase-based video magnification of some embodiments provides novel image representation that enables users to produce high-quality motion-magnified videos in real-time. To follow, practical results (and/or applications) of some embodiments are illustrated.

In the results to follow, embodiments include Spatial Decomposition mentioned above (e.g., the spatial domain pyramid) and the Approximate Riesz Transform also mentioned above. In some embodiments, the images and/or videos may be converted to in-phase quadrature (YIQ) colorspace and may process at least the luma (e.g., brightness) channel. The supplemental material (Wadhwa, N., Rubinstein, M., Durand, F., and Freeman, W. T., "Supplemental for Riesz Pyramids for Fast Phase-Based Video Magnification," retrieved from the Internet at people.csail.mit.edu under the directory "nwadhwa," followed by the sub-directory "riesz-pyramid," as the file "RieszPyrSupplemental.zip", May 2014, which is incorporated by reference in its entirety herein, and also included in its substance herein), provides further specifications of temporal bands and amplification factors that may be used for each sequence.

Figure 7A:
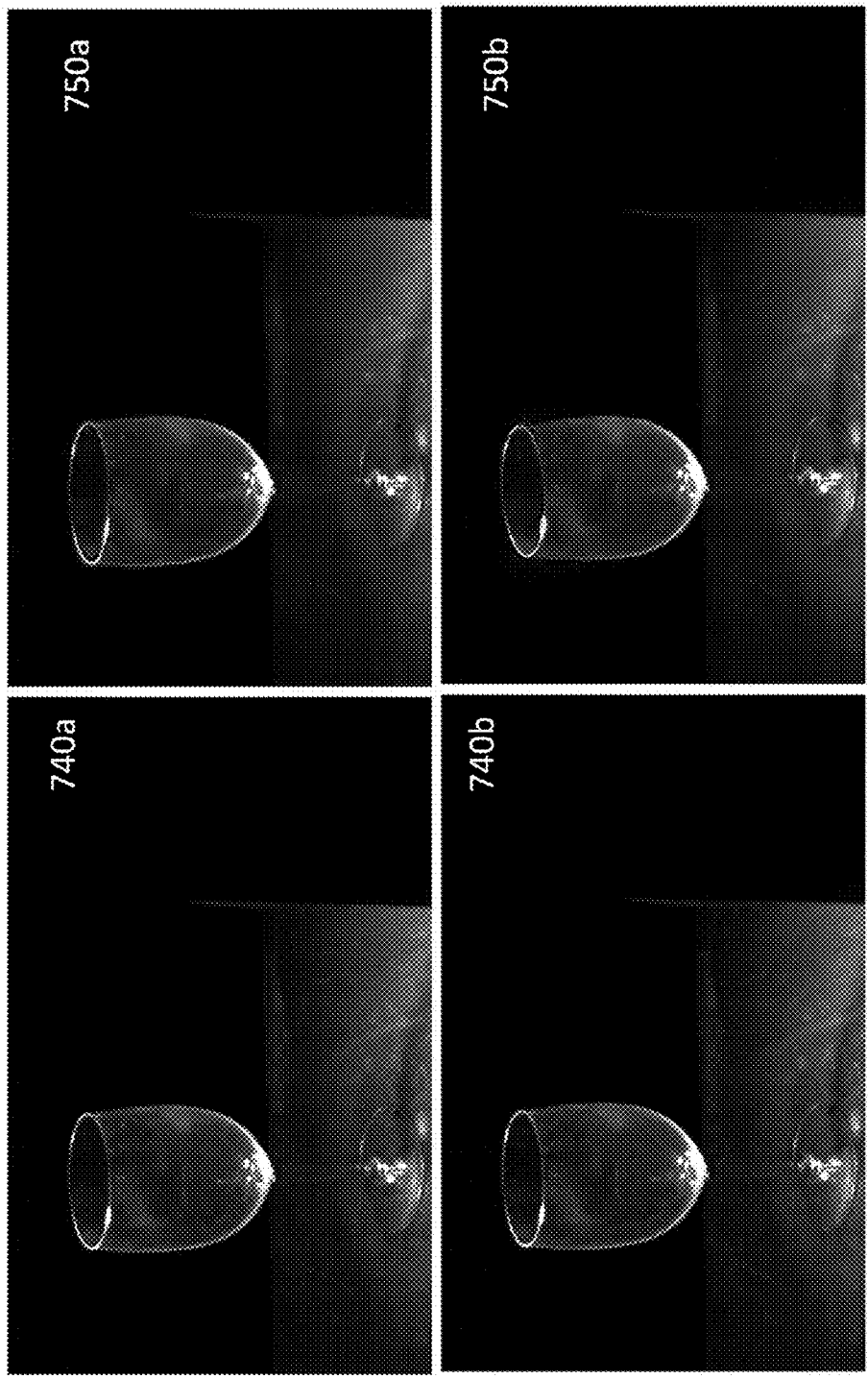
FIGS. 7A-7C illustrate representative image frames, including image frames from videos in which some embodiments make visible, by amplification, otherwise imperceptible motions.
Figure 7B:
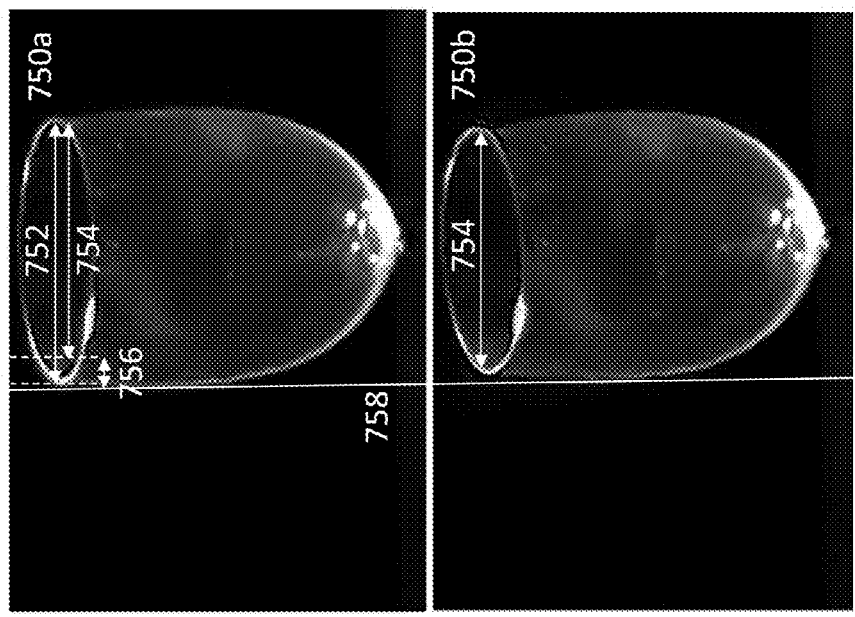
Figure 7C:
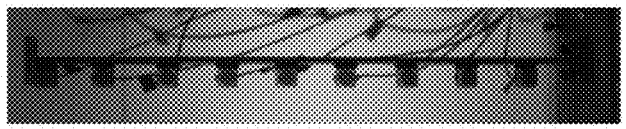
Figure 7C:
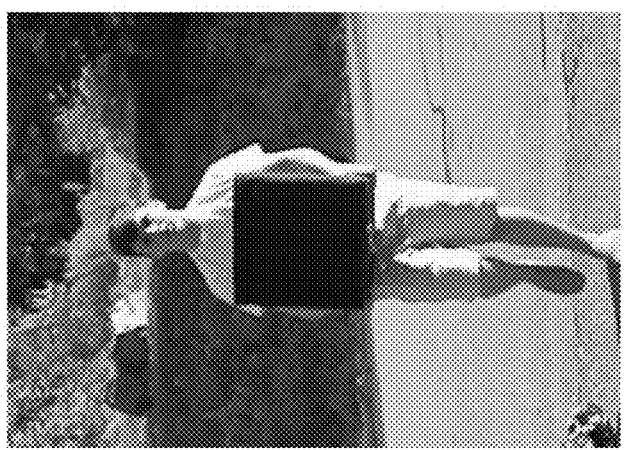
Figure 7C:
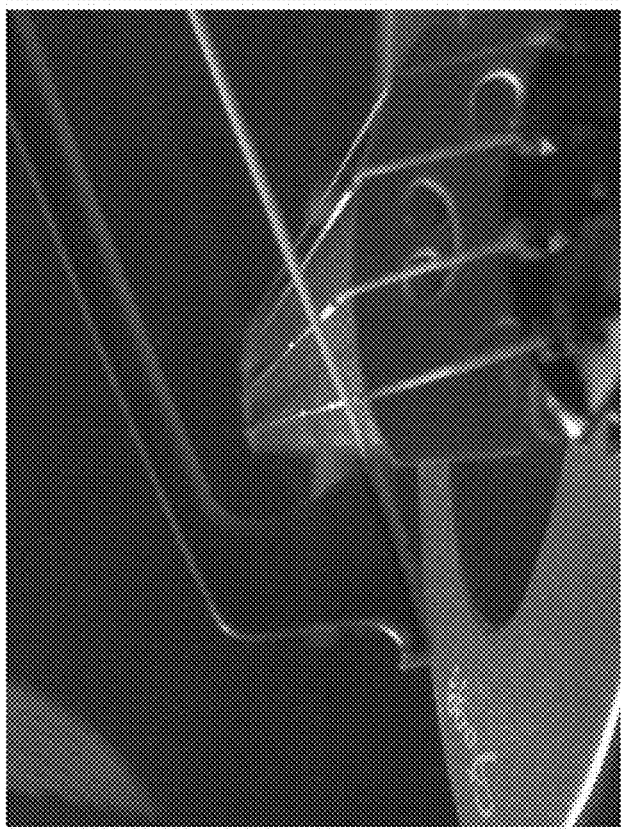

The world is full of small motions that are invisible to the naked eye. However, some embodiments enable users to point a camera at a scene and quickly amplify the motions within it. An advantage of some embodiments make it easier to find scenes with interesting small motions and reveal (and/or amplify, and/or magnify) the small motions. FIGS. 7A-7C illustrate representative frames from videos in which some embodiments amplify imperceptible motions. The full sequences and results are available in the supplementary materials located on the Internet at people.csail.mit.edu under the directory "nwadhwa" under sub-directory "riesz-pyramid," as the file "RieszPyrResultsAndComparisons.zip," May 2014.

FIG. 7A illustrates snapshot images of a recording (also available as "Applicants' Video—Wine Glass," May 2014, available on the Internet at people.csail.mit.edu under the directory "nwadhwa" under sub-directory "riesz-pyramid") of an embodiment that includes a real-time phase-based video magnification interface, in which an excited wine glass's oscillations are made visible by the embodiment. In the example of FIG. 7A, a 439 Hz note is played, the fundamental frequency of the wine glass at it, causing the wineglass to subtly move. In previous approaches, the strobed video, on the left (740a, 740b), the motions are too small to be seen. In some embodiments, however, the motions are visible, on the right (750a, 750b), when amplified 250 times with the Riesz Pyramid.

FIG. 7B represents a zoomed in picture of the images of FIG. 7A. As illustrated in FIG. 7B, some embodiments produce images that may include visible motion 756. A line 758 is drawn to show the wineglass edges of the images 750a, 750b. For non-limiting example, the diameter of the wineglass 754 (in image 750b) may visibly change to be a larger circumference 752 (in image 750a). As such, FIG. 7B represents a subtle but visible vibration motion 756 as the wineglass changes shape (from image 750a to image 750b).

A vibrating string on its own may make a very quiet sound. As a result, stringed musical instruments may be constructed so that the string vibrates a soundboard or a hollow resonating chamber producing most of the audible sound. FIG. 7C illustrates a violin 760 with a G string being played by a bow. The resulting vibrations are recorded by a high speed camera at 3000 frames per second (FPS). The associated high speed video (Applicants' Video Results and Comparisons, retrieved from the Internet at people.csail.mit.edu under the directory "nwadhwa," followed by the sub-directory "riesz-pyramid," as the file "RieszPyrResultsAndComparisons.zip," May 2014) reveals the intricate motions of the string. However, motion amplification in some embodiments reveals the otherwise invisible vibrations of the soundboard and tailpiece. Some embodiments suppress amplification near the violin string.

A man holding a weight struggles to maintain balance (element 770), but in a 300 frame per second high speed video (also known as the video "balance," located at people.csail.mit.edu under the directory "nwadhwa" under sub-directory "riesz-pyramid," as the file "RieszPyrResultsAndComparisons.zip," May 2014) this struggle is not clearly apparent. In some embodiments, the motions are amplified ten times in a passband between 1.0-8.0 Hertz (Hz), and the man's struggle is visible and the work that he is doing to hold the weight is visible.

When laminar flow becomes turbulent, there is a transition region in which sinusoidal instabilities grow before becoming unstable and turbulent (see for example, the following publication that is hereby incorporated by reference in its entirety herein: Tritton, D. J., "Physical Fluid Dynamics," Oxford, Clarendon Press, 1988, 536 p., 1, Nov. 1988). In FIG. 1A (also known as the video "smoke," retrieved from the Internet at people.csail.mit.edu under the directory "nwadhwa," followed by the sub-directory "riesz-pyramid," as the file "RieszPyrResultsAndComparisons.zip," May 2014) an embodiment reveals sinusoidal instabilities by applying motion magnification to a column of incense smoke transitioning from laminar to turbulent flow.

Chen et al. (see the following publication that is hereby incorporated by reference in its entirety herein: Chen, J. G., Wadhwa, N., Cha, Y.-J., Durand, F., Freeman, W. T., and Buyukorturk, O., "Structural Modal Identification Through High Speed Camera Video: Motion Magnification," Proceedings of the $32^{nd}$ International Modal Analysis Conference, IMAC July 2014, 191-197, hereinafter "Chen") may use local phase to compute the mode shape of a cantilever beam struck by a hammer from video. In an embodiment, a video 780 (also known as "column" people.csail.mit.edu under the directory "nwadhwa" under sub-directory "riesz-pyramid," as the file "RieszPyrResultsAndComparisons.zip," May 2014) uses motion amplification to visualize the mode shapes by amplifying the motions in the video along narrow temporal bands. These modes shapes shown by the embodiment in video 780 correspond to the theoretically derived shapes of the above-mentioned method of Chen.

Comparisons with Previous Techniques

Figure 8A:
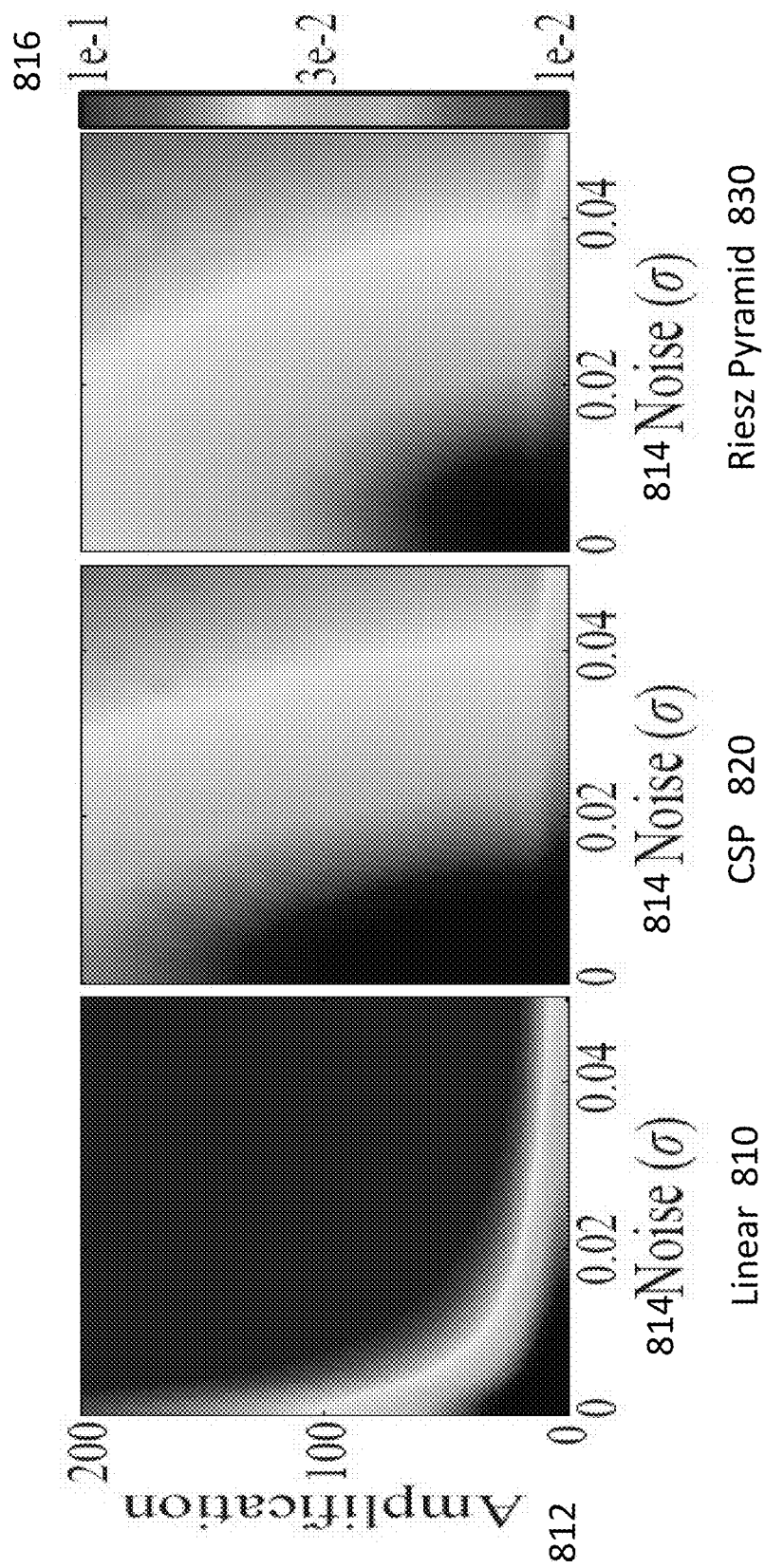
FIGS. 8A-8B illustrate a comparison between existing methods of motion magnification and a Riesz pyramid method according to some embodiments.

Some embodiments demonstrate that phase-based video magnification with the Riesz pyramid may yield results that are comparable in quality to those produced with the complex steerable pyramid, or CSP (see for example, the following publication hereby incorporated by reference in its entirety herein: Wadhwa, N., Rubinstein, M., Guttag, J., Durand, F., and Freeman, W. T., "Phase-Based Video Motion Processing," ACM Trans. Graph. (Proc. SIGGRAPH), 32, 4, Jul. 2013, 80:1-80:9), but much faster than the CSP. As illustrated in FIG. 8A, phase-based video magnification tests show results for an embodiment including a Riesz pyramid 830 compared with an eight orientation complex steerable pyramid 820 and linear video magnification 810. Test results are obtained for each of 810, 820, 830 by running on an input image frame sequence that includes a synthetic oscillating Gaussian, in which the ground truth motion magnified sequence is known.

The root-mean-square error (RMSE) of these techniques as a function of amplification factor α (element 812) and spatiotemporal image noise σ (element 814) is shown in FIG. 8A. FIG. 8A shows a comparison of an embodiment that uses a Riesz Pyramid 830 versus previous Eulerian video magnification methods 810, 820 on a synthetic oscillating Gaussian, in which the ground truth amplified motion is known. In FIG. 8A, the logarithm of the RMSE (see logarithmic color scale 816) is shown in color for the linear method 810, for the complex steerable pyramid phase-based method 820 and for some embodiments 830.

Figure 8B:
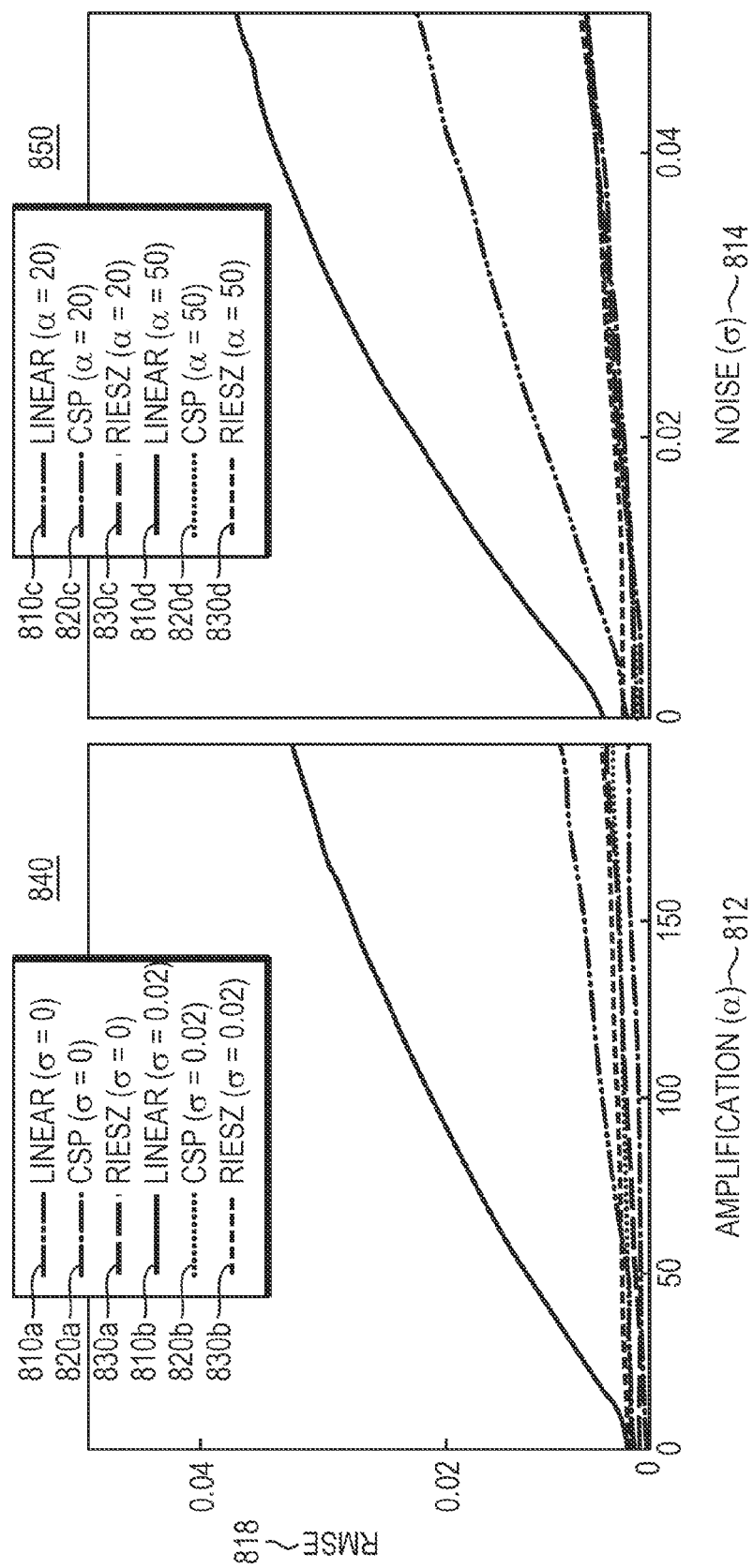

In FIG. 8B, the RMSE 818 vs. amplification 812 (RSME vs. amplification being represented as graph 840) are shown for the three methods, Linear, CSP, and a Riesz Pyramid embodiment, for a noises of σ=0 (see elements 810a, 820a, 830a, respectively) and σ=0.02 (see elements 810b, 820b, 830b, respectively). Also in FIG. 8B, the RMSE 818 vs. noise 814 (RSME vs. noise being represented as graph 850) are shown for the three methods, Linear, CSP, and Riesz Pyramid embodiment, for a amplification factors a=20 (see elements 810c, 820c, 830c, respectively) and a=50 (see elements 810d, 820d, 830d, respectively).

As FIGS. 8A-8B illustrate, for the amplification factors and noise levels, the RMSE for the Riesz Pyramid embodiment (referring to element 830 of FIG. 8A and elements 830a, 830b, 830c, 830d of FIG. 8B) is very close to that of phase-based video magnification with the complex steerable pyramid (referring to element 820 of FIG. 8A and elements 820a, 820b, 820c, 820d of FIG. 8B) and substantially better than the linear method (referring to element 810 of FIG. 8A and elements 810a, 810b, 810c, 810d of FIG. 8B). In at least some embodiments, using natural image sequences as input, the magnified output is of comparable quality to using the complex steerable pyramid, as illustrated in FIG. 1A.

The table below (Table 4) illustrates running times in seconds (in Table 4, columns 3 through 7) of comparable MATLAB implementations of phase-based motion magnification with an embodiment of the Riesz pyramid and several variants of the complex steerable pyramid. The phase-based methods are run with spatial phase denoising of the same value of ρ. Video read and write time is preferably not included. As specified in Wadhwa (hereby incorporated by reference herein in its entirety: Wadhwa, N., Rubinstein, M., Guttag, J., Durand, F., and Freeman, W. T., "Phase-Based Video Motion Processing," ACM Trans. Graph. (Proc. SIGGRAPH), 32, 4, Jul. 2013, 80:1-80:9), the eight orientation octave bandwidth pyramid representation is used (see column 4, Table 4). Results are also shown for the method using the smallest possible complex steerable pyramid, a two orientation octave bandwidth pyramid (see column 5 of Table 4). The third row of Table 4 (titled "Domain") specifies whether the pyramid was constructed in the spatial or frequency domains. For each sequence shown in Table 4, the fastest phase-based method is highlighted in bold.

tions of linear video magnification and phase-based video magnification using 8 and 2 orientation complex steerable pyramids, the Riesz pyramid implemented in the frequency domain and the Riesz pyramid implemented in the spatial domain. Using the spatial domain, the Riesz pyramid embodiment may yield the fastest phase-based method, producing results four to five times faster than the 8 orientation complex steerable pyramid used in Wadhwa (Wadhwa, N., Rubinstein, M., Guttag, J., Durand, F., and Freeman, W. T., "Phase-Based Video Motion Processing," ACM Trans. Graph. (Proc. SIGGRAPH), 32, 4, Jul. 2013, 80:1-80:9). In some embodiments, the Riesz pyramid is at least 20% to 80% faster than even the two orientation complex steerable pyramid. The spatial domain Riesz pyramid embodiment may also be faster than the frequency domain implementation, demonstrating the advantage of additional speed that the embodiment provides by way of its spatial domain decomposition and approximate Riesz transform.

Real Time Implementation

Embodiments may be implemented on a computer, using in a programming language, including but not limited to C++ or MATLAB. For non-limiting example, some embodiments include a C++ implementation of an embodiment that uses phase-based video magnification with the Riesz pyramid, using platform-independent and operating-system-independent tools, including, but not limited to, Open Source Computer Vision (Open CV) and a cross-platform application framework (QT software). Some embodiments may process a live 640×400 pixel video at 25 frames per second on a laptop with four cores and 16 GB ram. The algorithm of the Riesz pyramid may run on the CPU with a single core. In some embodiments, the operations may be compact linear filters or elementwise operations, a parallelized or GPU implementation may further increase the speed of the implementation. In some embodiments, a Laplacian pyramid is used, in which the image is blurred and downsampled with a 5×5 Gaussian kernel (FIG. 5A, element 510) as the spatial decomposition.

Figure 9:
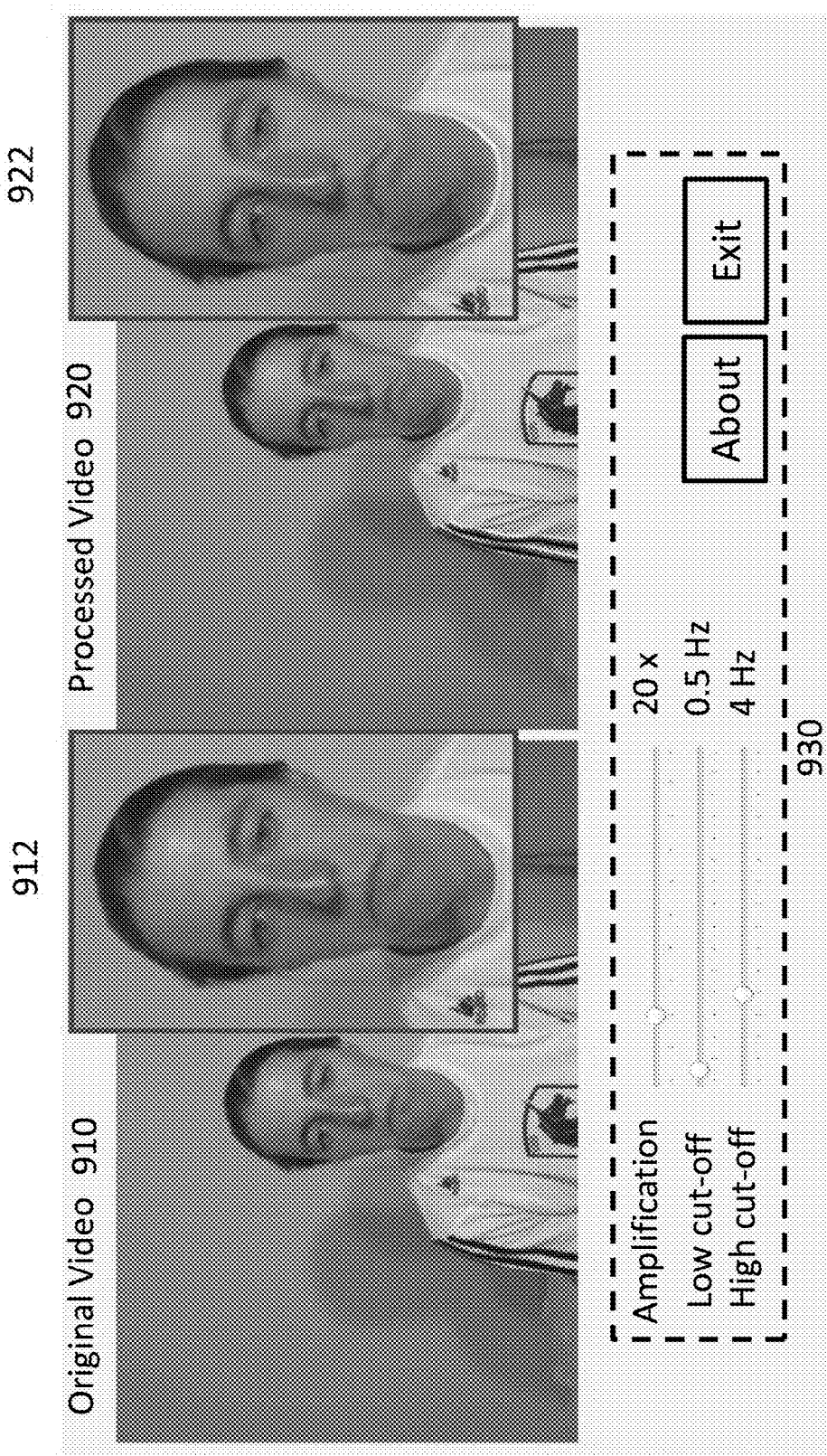
FIG. 9 illustrates a real time implementation, showing a woman's facial expressions as amplified and caricatured without artifacts, according to some embodiments.

FIG. 9 illustrates a frame from a real time implementation of an embodiment. In FIG. 9 illustrates real time implementation of an embodiment in action: a woman's original facial expressions 910 are amplified and caricatured without artifacts 920. A zoom-in of the face is overlayed, further illustrating a zoomed in version of her original facial expressions 912, and her resulting amplified and caricatured facial expressions 922. Some embodiments include an optional graphical user interface control panel 930 which may include amplification settings, and high and low cut-off settings. The woman 930 may use it to amplify the changes in her facial expres-

TABLE 4

| Video Type Domain | Resolution (h × w × t) | Wu et al. Linear Space | Wadhwa et al. Phase Frequency | 2 Orient. CSP Phase Frequency | Riesz (Freq.) Phase Frequency | Riesz (Space) Phase Space |
|---|---|---|---|---|---|---|
| Crane | 280 × 280 × 220 | 6.0 | 43.0 | 15.9 | 13.6 | 10.1 |
| Guitar | 432 × 192 × 300 | 7.9 | 60.5 | 23.5 | 20.4 | 14.9 |
| Baby | 960 × 540 × 300 | 35.6 | 325.9 | 95.7 | 101.6 | 75.4 |
| Camera | 512 × 384 × 1000 | 46.6 | 375.7 | 140.3 | 122.5 | 91.5 |
| Violin | 480 × 360 × 300 | 12.7 | 115.8 | 43.1 | 34.9 | 29.3 |
| Balance | 272 × 384 × 300 | 7.7 | 72.7 | 30.7 | 23.6 | 18.3 |
| Smoke | 240 × 600 × 300 | 11.7 | 92.3 | 32.5 | 30.6 | 25.7 |
| Column | 200 × 1056 × 600 | 41.7 | 259.7 | 95.3 | 90.8 | 76.5 |

As illustrated in Table 4, an advantage of some embodiments is that they are much faster to compute than the existing complex steerable pyramid approach. In Table 4, the running times are displayed for comparable MATLAB implementasions, which cause her face to appear caricatured. A recording of this real time implementation is included in the supplementary material (which may be retrieved from the Internet at people.csail.mit.edu under the directory "nwadhwa," followed by the sub-directory "riesz-pyramid," as the file "RieszPyrResultsAndComparisons.zip," May 2014).

The embodiments illustrated herein exhibit considerable computational savings over using the complex steerable pyramid for phase-based video magnification. In some embodiments, this savings is achieved because the phase is shifted along the dominant orientation in an image rather than in every orientation.

Wadhwa may use half and quarter octave bandwidth pyramids to increase the amount by which motions may be shifted. Since some embodiments include a representation which provides a functional improvement (e.g., improved speed and reduced computation complexity) over the octave-bandwidth pyramid complex steerable pyramid. In some embodiments, the Riesz pyramid approach (system and/or method and/or algorithm and/or technique) may be improved further by using non-oriented versions of these sub-octave bandwidth pyramids as the spatial decomposition in the Riesz pyramid.

In summary, as some embodiments herein illustrate, the Riesz pyramid may be used as a much faster replacement for the complex steerable pyramid in phase-based video magnification without a reduction in quality. Some embodiments include an image representation that decomposes the image using an invertible octave-bandwidth pyramid specified by compact, symmetric lowpass and highpass filters, and then computes an approximate Riesz transform by using two three-tap finite difference filters. Some embodiments that include the Riesz pyramid enable real-time implementation of phase-based motion magnification. In addition, some embodiments may have other applications where the phase in sub-bands is important such as stereo matching and phase-based optical flow.

Figure 10:
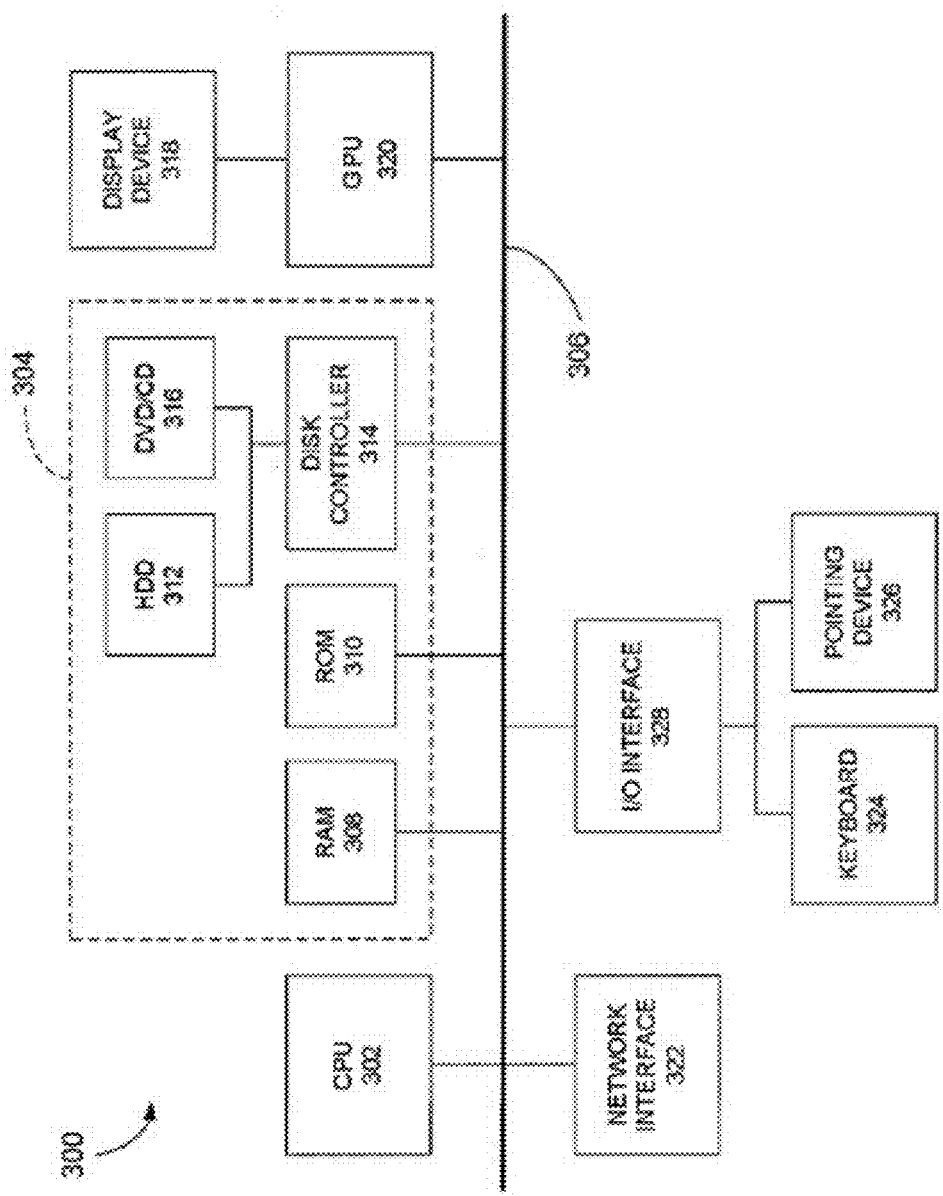
FIG. 10 is a block diagram, according to some embodiments of the present invention.

FIG. 10 is a high-level block diagram of an embodiment 300 of the present invention system and/or method 150 that generates motion magnified images from an input image frame according to the principles of the present invention. The computer-based system 300 contains a bus 306. The bus 306 is a connection between the various components of the system 300. Connected to the bus 306 is an input/output device interface 328 for connecting various input and output devices, such as a keypad, controller unit, keyboard (generally 324), mouse/pointing device 326, display, speakers, touchscreen display (generally display device 318), etc. to the system 300. According to an embodiment of the invention, the input/output device interface 328 provides an interface for allowing a user to select image (and/or video) display parameters and aspects using any method as is known in the art.

A central processing unit (CPU) 302 is connected to the bus 306 and provides for the execution of computer instructions. Memory 310 provides volatile storage for data used for carrying out computer instructions. Storage or RAM 308 provides nonvolatile storage for software instructions such as an operating system. The system 300 also comprises a network interface 322, for connecting to any variety of networks, including wide area networks (WANs), local area networks (LANs), wireless networks, mobile device networks, cable data networks and so on.

In particular the steps of the processes described above and/or any additional processes that may be related to those described above may be stored as computer executable instructions in, for example a memory area 304 that is operably and/or communicatively coupled to the processor 302 and to a GPU 320 by a system bus 306 or similar supporting data communication line. A "memory area" as used herein, refers generally to any means of storing program code and instructions executable by one or more processors to aid in rendering a video (and/or image) display, receiving a video stream, generating images, downsampling, applying a Riesz transform, computing a local phase, and performing filtering (temporal and/or spatial), amplification, and reconstruction, with respect to the given input image frame (i.e., automatically generating a motion magnified image for each given input image frame).

The memory area 304 may include one, or more than one, form of memory. For example the memory area 304 may include random access memory (RAM) 308, which may include non-volatile RAM, magnetic RAM, ferroelectric RAM, and/or other forms of RAM. The memory area 304 may also include read-only memory (ROM) 310 and/or flash memory and/or electrically erasable programmable read-only memory (EEPROM). Any other suitable magnetic, optical and/or semiconductor memory, such as a hard disk drive (HDD) 312, by itself or in combination with other forms of memory, may be included in the memory area 304. HDD 312 may be coupled to a disk controller 314 for use in transmitting and receiving messages to and from processor 302. Moreover the memory area 304 may also be or may include a detachable or removable memory 316 such as a suitable cartridge disk, CD-ROM, DVD, or USB memory. The memory area 304 may in some embodiments effectively include cloud computing memory accessible through network interface 322, and the like. The above examples are exemplary only, and thus, are not intended to limit in any way the definition and/or meaning of the term "memory area."

In embodiments, a CPU 302 sends a stream of two-dimensional (2D) and/or three-dimensional (3D) video images (including, but not limited to the three dimensions of an x-axis, a y-axis, and time) to GPU 320 via a system bus 306 or other communications coupling. GPU 320 employs the above-described methods, algorithms and computer-based techniques as programmed in memory area 304 to generate correctly filtered, motion-magnified video images for display on display device 318. The GPU 320 forms a picture of the screen image and stores it in a frame buffer. This picture is a large bitmap used to continually update and drive the screen image on display device 318. Although the preferred embodiment sends a stream of two-dimensional (2D) video images to the GPU 320, one skilled in the art realizes that embodiments may include a stream of three-dimensional and/or four-dimensional video images (including, but not limited to three dimensions including an x-axis, a y-axis, and time, or four dimensions including a x-axis, y-axis, z-axis, and time).

The display device 318 may be, without limitation, a monitor, a television display, a plasma display, a liquid crystal display (LCD), a display based on light emitting diodes (LED), a display based on organic LEDs (OLEDs), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only, and thus, are not intended to limit in any way the definition and/or meaning of the term "display device."

While this invention has been particularly shown and described with references to example embodiments thereof, it will be understood by those skilled in the art that various changes in form and details may be made therein without departing from the scope of the invention encompassed by the appended claims.

For non-limiting example, frequency bands may be referred to as bands and/or sub-bands. For non-limiting example, an image representation may be referred to a representation. For non-limiting example, spatial phase may be referred to as local phase. For non-limiting example, an image frame may be referred to as an image, frame, and/or video. For non-limiting example, a filter may include an analog and/or digital frequency filter, a finite impulse response (FIR) filter or an infinite impulse response (IIR), and the filter may be linear time-invariant, but is not so limited.

What is claimed is:

1. A computer-implemented method of rendering a video display, comprising the computer-implemented steps, by a processor and associated memory:
   receiving a video stream formed of a sequence of one or more frames, each frame having image content;
   for each given frame of the sequence of frames:
   generating a first set of images, each image of the first set corresponding to the given frame, and each image of the first set including a unique spatial frequency band;
   downsampling at least one image of the first set one or more times;
   applying a Riesz transform to at least one of the downsampled images;
   generating an image representation, based upon the application of the Riesz transform, the image representation including a second set of images, at least one image of the second set being horizontally phase shifted with respect to a given corresponding image of the first set, the image representation including a third set of images, at least one image of the third set being vertically phase shifted with respect to a given corresponding image of the first set;
   computing a local phase for at least one image of the image representation;
   generating a temporally filtered local phase based upon applying one or more temporal band pass filters to the local phase and based upon one or more previous local phases;
   generating an updated image representation based upon the temporally filtered local phase and the at least one image of the image representation;
   amplifying one or more images of the updated image representation;
   constructing a given replacement image based upon the amplified image representation, the replacement image corresponding to the given frame and the replacement image exhibiting amplified motions as compared with the given frame; and
   displaying the given replacement image.

2. The computer-implemented method of claim 1, further comprising:
   selecting, by a user, one or more preferred temporal frequencies of the image representation, and applying the selected temporal frequencies to the one or more temporal band pass filters.

3. The computer-implemented method of claim 1, wherein the one or more temporal band pass filters include at least one noise filter.

4. The computer-implemented method of claim 1, further comprising:
   applying one or more noise filters to the temporally filtered image representation, at least one of the one or more noise filters performing spatial blurring of the temporally filtered image representation.

5. The computer-implemented method of claim 1, wherein generating the first set of images and downsampling the first set of images are performed based on a Laplacian Pyramid.

6. The computer-implemented method of claim 1, wherein the Riesz transform includes two three-tap linear filters.

7. The computer-implemented method of claim 1, wherein the video display includes a real-time video display.

8. The computer-implemented method of claim 1, wherein the video display includes a two-dimensional (2D) video display.

9. The computer-implemented method of claim 1, wherein the video display includes an image display and the video stream includes an image stream.

10. The computer-implemented method of claim 1, further comprising:
    for each given frame of the sequence of frames:
    generating an output video stream, the output video stream including each given replacement image that corresponds to each given frame of the sequence of frames.

11. The computer-implemented method of claim 1, wherein the computer-implemented steps are performed at a speed that is at least a factor of 3.5 compared with, and with equivalent visible quality to, a method for motion amplification that uses a complex steerable pyramid.

12. The computer-implemented method of claim 1, further comprising
    generating the temporally filtered local phase based upon applying the one or more temporal band pass filters to the local phase and based upon one or more previous local phases that are associated with one or more previous image representations.

13. A computer-implemented system for rendering a video display, comprising:
    a receiving module configured to receive a video stream formed of a sequence of one or more frames, each frame having image content;
    a computing module, for each given frame of the sequence of frames, the computing module being configured to:
    generate a first set of images, each image of the first set corresponding to the given frame, and each image of the first set including a unique spatial frequency band;
    downsample at least one image of the first set one or more times;
    apply a Riesz transform to at least one of the downsampled images;
    generate an image representation, based upon the application of the Riesz transform, the image representation including a second set of images, at least one image of the second set being horizontally phase shifted with respect to a given corresponding image of the first set, the image representation including a third set of images, at least one image of the third set being vertically phase shifted with respect to a given corresponding image of the first set;
    compute a local phase for at least one image of the image representation;
    generate a temporally filtered local phase based upon applying one or more temporal band pass filters to the local phase;
    generate an updated image representation based upon the temporally filtered local phase and the at least one image of the image representation;
    amplify one or more images of the updated image representation;
    construct a given replacement image based upon the amplified image representation, the replacement image corresponding to the given frame and the replacement image exhibiting amplified motions as compared with the given frame; and
    a display module configured to display the given replacement image.

14. The computer-implemented system of claim 13, wherein the computing module is further configured to select, by a user, one or more preferred temporal frequencies of the image representation, and apply the selected temporal frequencies to the one or more temporal band pass filters.

15. The computer-implemented system of claim 13, wherein the one or more temporal band pass filters include at least one noise filter.

16. The computer-implemented system of claim 13, wherein the computing module is further configured to apply one or more noise filters to the temporally filtered image representation, at least one of the one or more noise filters configured to perform spatial blurring of the temporally filtered image representation.

17. The computer-implemented system of claim 13, wherein the computing module is further configured to generate the first set of images and downsample the first set of images based on a Laplacian Pyramid.

18. The computer-implemented system of claim 13, wherein the Riesz transform includes two three-tap linear filters.

19. The computer-implemented system of claim 13, wherein the video display includes a real-time video display.

20. The computer-implemented system of claim 13, wherein the video display includes a two-dimensional (2D) video display.

21. The computer-implemented system of claim 13, wherein the video display includes an image display and the video stream includes an image stream.

22. The computer-implemented system of claim 13, wherein the computing module is further configured to generate, for each given frame of the sequence of frames, an output video stream, the output video stream including each given replacement image that corresponds to each given frame of the sequence of frames.

23. A non-transitory computer readable medium having stored thereon a sequence of instructions which, when loaded and executed by a processor coupled to an apparatus, causes the apparatus to:

receive a video stream formed of a sequence of one or more frames, each frame having image content;

for each given frame of the sequence of frames:

generate a first set of images, each image of the first set corresponding to the given frame, and each image of the first set including a unique spatial frequency band;

downsample at least one image of the first set one or more times;

apply a Riesz transform to at least one of the downsampled images;

generate an image representation, based upon the application of the Riesz transform, the image representation including a second set of images, at least one image of the second set being horizontally phase shifted with respect to a given corresponding image of the first set, the image representation including a third set of images, at least one image of the third set being vertically phase shifted with respect to a given corresponding image of the first set;

compute a local phase for at least one image of the image representation;

generate a temporally filtered local phase based upon applying one or more temporal band pass filters to the local phase;

generate an updated image representation based upon the temporally filtered local phase and the at least one image of the image representation;

amplify one or more images of the updated image representation;

construct a given replacement image based upon the amplified image representation, the replacement image corresponding to the given frame and the replacement image exhibiting amplified motions as compared with the given frame; and display the given replacement image.

* * * * *